(12) United States Patent
Kozu et al.

(10) Patent No.: US 7,927,386 B2
(45) Date of Patent: Apr. 19, 2011

(54) METHOD FOR MANUFACTURING A BATTERY PACK

(75) Inventors: Katsumi Kozu, Sanda (JP); Takeshi Ishimaru, Moriguchi (JP); Yoshiki Osawa, Suita (JP); Satoshi Kataoka, Takaoka-gun (JP); Iichiro Mori, Itami (JP); Koichi Toriyama, Moriguchi (JP); Masahiro Mizuta, Souraku-gun (JP); Tatsuhisa Chikada, Hirakata (JP); Yasuhiro Ogawa, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 406 days.

(21) Appl. No.: 12/286,399

(22) Filed: Sep. 30, 2008

(65) Prior Publication Data

US 2009/0038145 A1    Feb. 12, 2009

Related U.S. Application Data

(62) Division of application No. 10/502,303, filed as application No. PCT/JP03/01269 on Feb. 6, 2003, now Pat. No. 7,429,432.

(30) Foreign Application Priority Data

Feb. 13, 2002  (JP) .................. 2002-034926
Mar. 22, 2002  (JP) .................. 2002-081241

(51) Int. Cl.
    *H01M 6/00*    (2006.01)
    *B29C 45/14*   (2006.01)

(52) U.S. Cl. .................. 29/623.1; 29/623.2; 264/272.21

(58) Field of Classification Search ................. 29/623.1, 29/623.2, 623.4; 429/96, 100, 180, 178, 429/185, 181; 264/104, 176.1, 177.16, 272.21
See application file for complete search history.

(56) References Cited

U.S. PATENT DOCUMENTS

| | | | |
|---|---|---|---|
| 3,948,441 A | 4/1976 | Perkins et al. | |
| 5,106,708 A | 4/1992 | Bish et al. | |
| 5,298,347 A | 3/1994 | Aksoy et al. | |
| 5,466,545 A | 11/1995 | Chamberlain et al. | |
| 5,508,131 A | 4/1996 | Bowen et al. | |
| 5,735,040 A * | 4/1998 | Ochi et al. | 29/841 |
| 5,818,198 A | 10/1998 | Mito et al. | |
| 5,968,682 A | 10/1999 | Moriyama et al. | |
| 6,114,942 A | 9/2000 | Kitamoto et al. | |
| 6,117,576 A | 9/2000 | Sugai | |
| 6,210,824 B1 | 4/2001 | Sullivan et al. | |
| 6,432,575 B1 | 8/2002 | Yamagami | |
| 6,451,474 B1 | 9/2002 | Kozu et al. | |
| 6,524,732 B1 * | 2/2003 | Iwaizono et al. | 429/7 |
| 6,824,917 B2 | 11/2004 | Aaltonen et al. | |
| 6,861,821 B2 | 3/2005 | Masumoto et al. | |
| 6,994,926 B2 | 2/2006 | Ikeuchi et al. | |

(Continued)

FOREIGN PATENT DOCUMENTS

EP    1-032-108    8/2000

(Continued)

*Primary Examiner* — Raymond Alejandro
(74) *Attorney, Agent, or Firm* — Jordan and Hamburg LLP

(57) ABSTRACT

A rechargeable battery (2) and a circuit substrate (3) are connected by lead plates (4, 5) and united by a primary mold (11) that is formed by filling resin therebetween, after which a secondary mold (12) is formed on the outer face by filling resin at necessary locations and a winding sheet (13) is wound around the periphery, thereby forming a battery pack.

11 Claims, 24 Drawing Sheets

U.S. PATENT DOCUMENTS

| | | |
|---|---|---|
| 7,248,021 B2 | 7/2007 | Kozu et al. |
| 2002/0173709 A1 | 11/2002 | Fine et al. |
| 2003/0003357 A1 | 1/2003 | Tamai et al. |
| 2003/0082441 A1 | 5/2003 | Hovi et al. |
| 2003/0173709 A1 | 9/2003 | Iwaizono et al. |
| 2003/0180582 A1 | 9/2003 | Masumoto et al. |
| 2005/0106454 A1 | 5/2005 | Kozu et al. |
| 2005/0112456 A1 | 5/2005 | Kozu et al. |
| 2005/0151514 A1 | 7/2005 | Kozu et al. |

FOREIGN PATENT DOCUMENTS

| | | |
|---|---|---|
| EP | 1-093-178 | 4/2001 |
| EP | 1-309-020 | 5/2003 |
| EP | 1-403-942 | 3/2004 |
| GB | 2-216-247 | 10/1989 |
| JP | 64-072458 | 3/1989 |
| JP | 4-162345 | 6/1992 |
| JP | 05-159758 | 6/1993 |
| JP | 07-057721 | 3/1995 |
| JP | 8-162078 | 6/1996 |
| JP | 9-134714 | 5/1997 |
| JP | 9-139235 | 5/1997 |
| JP | 10-275612 | 10/1998 |
| JP | 11-176400 | 7/1999 |
| JP | 2000-021372 | 1/2000 |
| JP | 2000-315483 | 11/2000 |
| JP | 2002-110121 | 4/2002 |
| JP | 2002-134077 | 5/2002 |
| JP | 2002-166447 | 6/2002 |
| JP | 2002-245994 | 8/2002 |
| JP | 2002-245999 | 8/2002 |
| JP | 2002-260608 | 9/2002 |
| JP | 2002-260609 | 9/2002 |
| JP | 2002-373630 | 12/2002 |
| JP | 2003-17022 | 1/2003 |
| JP | 2003-22789 | 1/2003 |
| JP | 2003-022789 | 1/2003 |
| JP | 2003-86159 | 3/2003 |
| WO | WO 01-99211 | 12/2001 |
| WO | WO-03/003485 | 1/2003 |

* cited by examiner

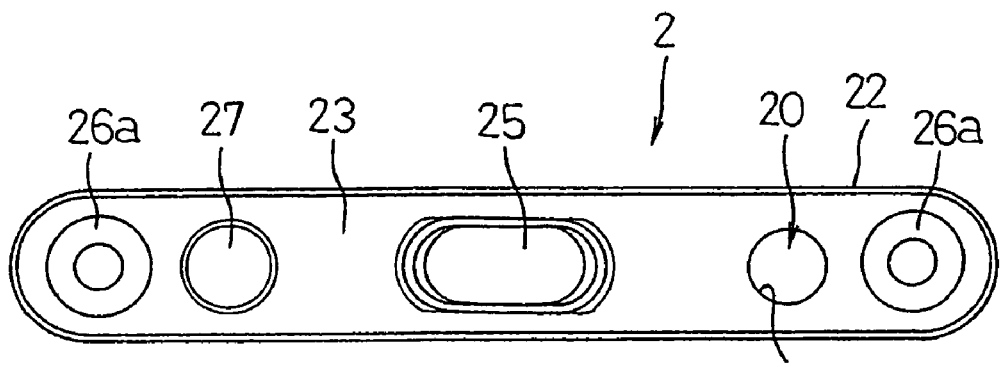
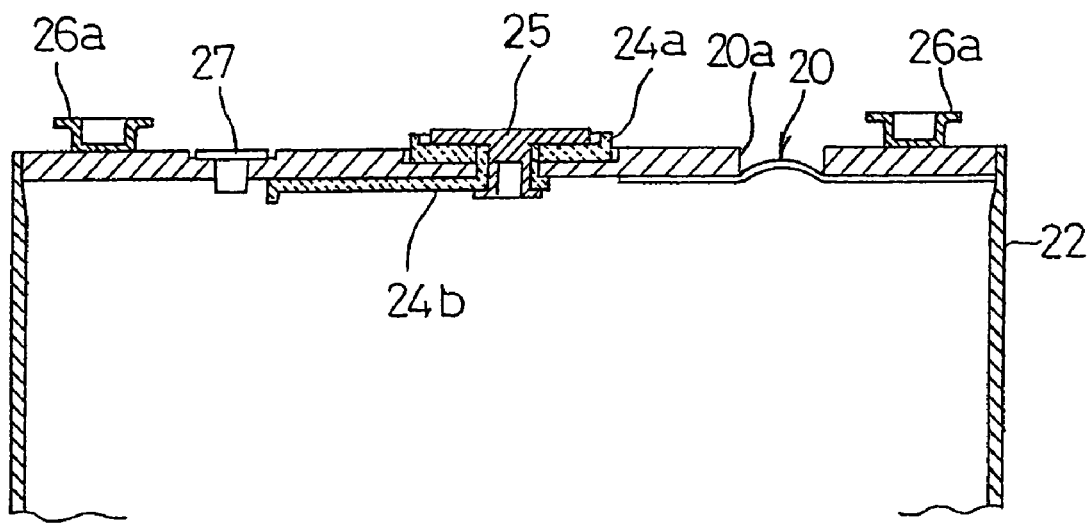

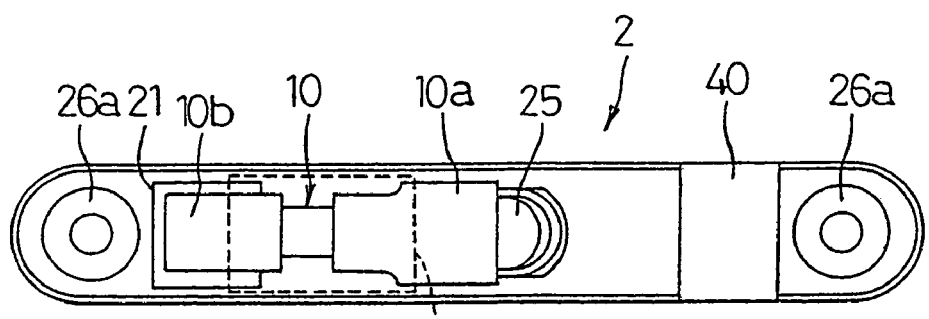
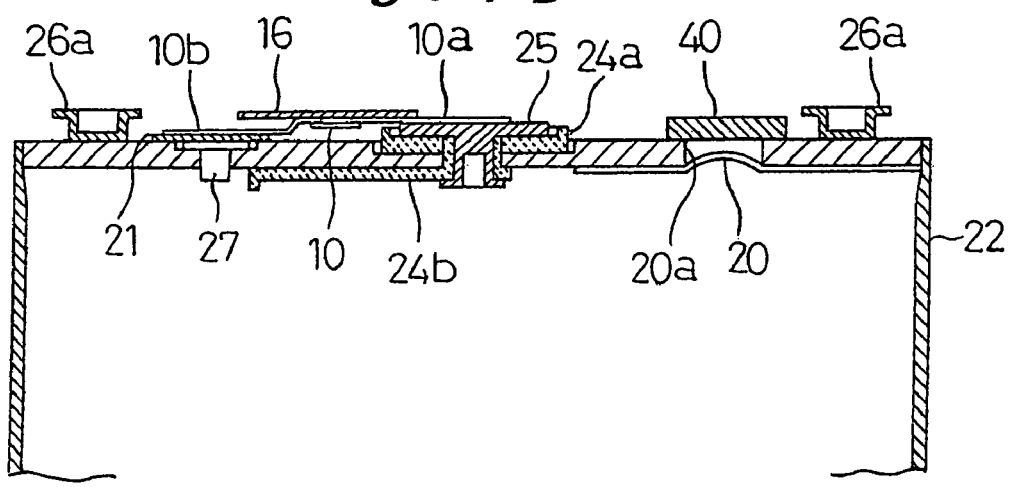

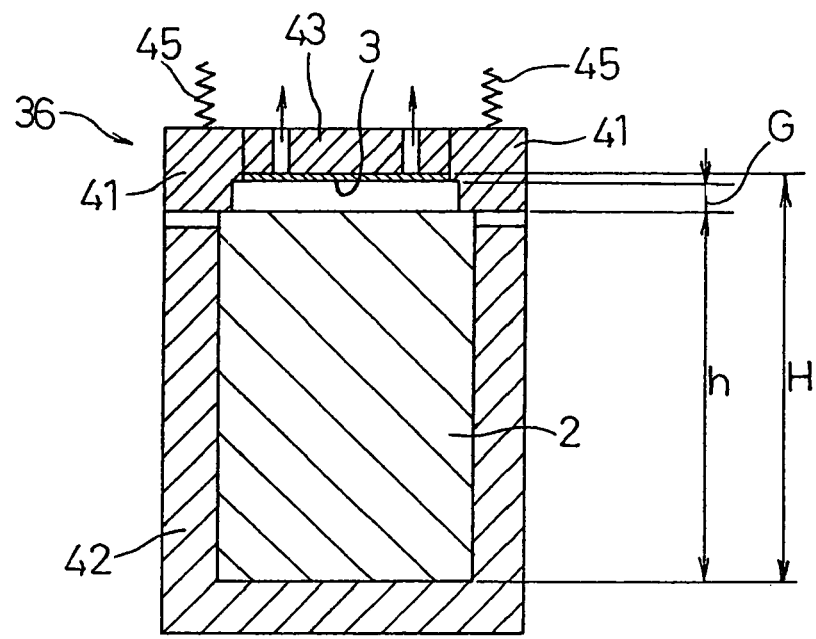
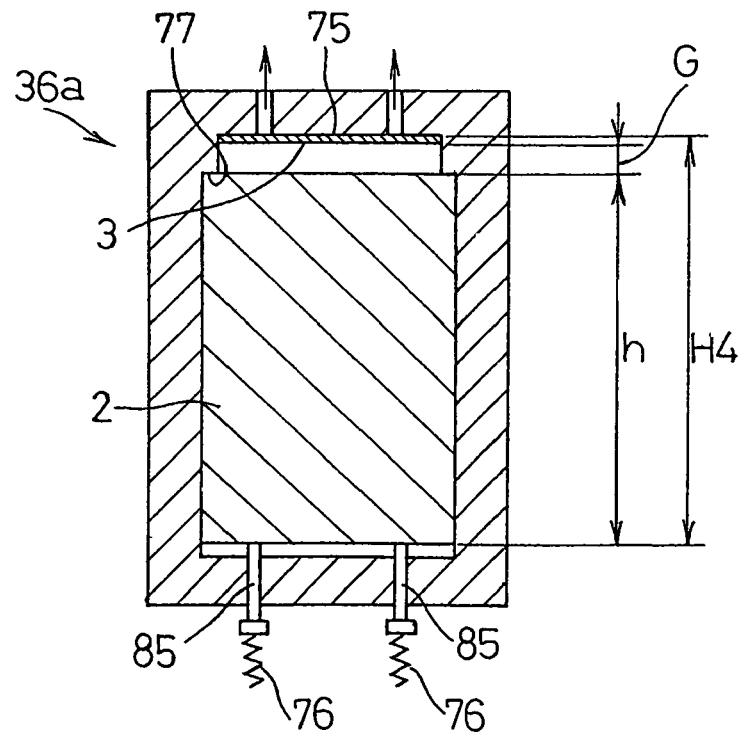

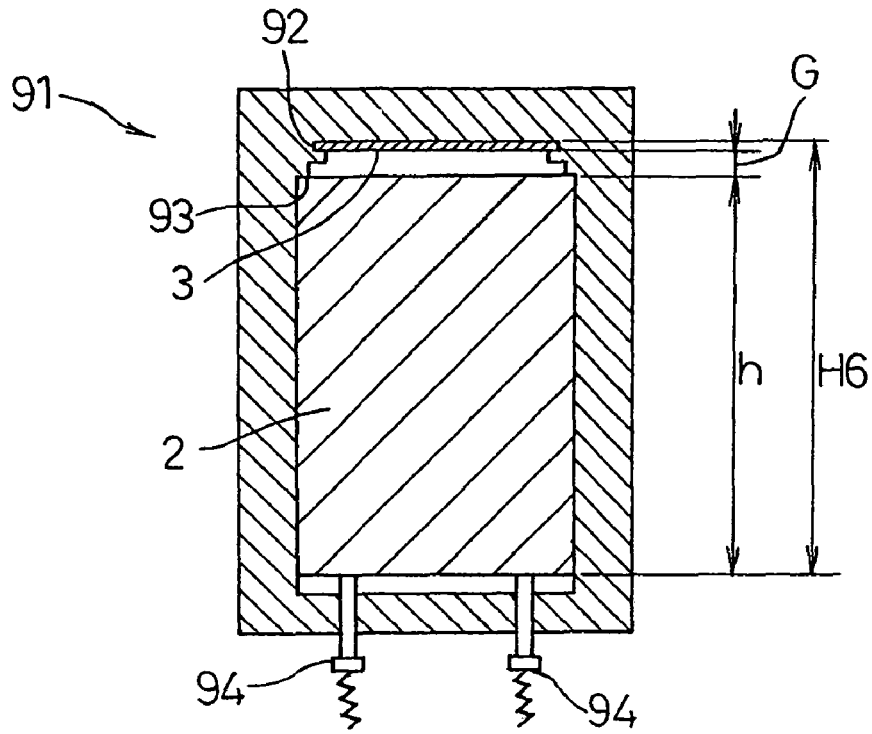
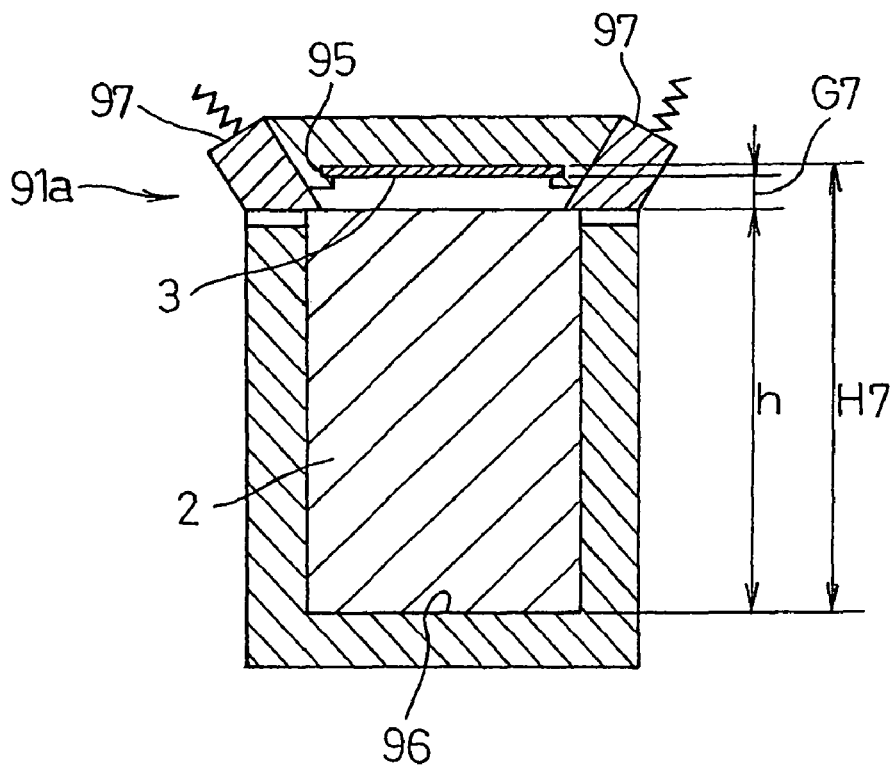

METHOD FOR MANUFACTURING A BATTERY PACK

TECHNICAL FIELD

The present invention relates to a battery pack in which constituent elements are united by filling with resin to reduce the size thereof and improve the rigidity thereof so that it is suitable as a power source for portable electronic equipment, and a manufacturing method thereof.

BACKGROUND ART

With the remarkable development of small, thin, and high-functionality portable electronic equipment such as mobile phones and PDAs, there is a growing demand for smaller, thinner, and high-capacity batteries as their power source. Lithium ion rechargeable batteries can be designed small and high-capacity, and in particular, flat prismatic types are suitable in making the equipment thinner; they have therefore been increasingly used as the repeatedly usable rechargeable battery for portable electronic equipment.

Because lithium ion rechargeable batteries have high energy density and contain a flammable organic solvent as electrolyte, it is essential to take account of safety measures. They must have such safety features as to ensure that no damage is caused to the equipment or injury to the user in the event that an abnormality arises for some reason. For example, if the positive and negative terminals of the battery are short-circuited for some reason, a large short-circuit current flows in high energy density batteries, whereupon the inner resistance generates Joule heat and the battery temperature rises. A temperature rise in the battery causes a rapid build-up of gas pressure inside resulting from reactions between positive electrode active materials and electrolyte, or from evaporation or decomposition of electrolyte, which may result in fire or explosion of the battery. Batteries may fall into a high-temperature state not only because of external short-circuiting but also of overcharge; the same applies if the portable electronic equipment loaded with the battery is placed near a heater or left inside a car parked in a hot weather environment.

A battery abnormality can be induced by any of electrical, mechanical, or thermal factors; thus non-aqueous electrolyte batteries represented by lithium ion rechargeable batteries are provided with safety features for preventing batteries from falling into an abnormal state and for evading a further dangerous state even if an abnormality should arise. Such features are usually incorporated in batteries as their own natures; for example, active materials on the electrodes and electrolyte may be made not to be excessively reactive, or, a polyolefin porous film may be employed for the separator because of its "shutdown function," in which minute pores are softened and close under an abnormally high temperature. Cylindrical lithium ion rechargeable batteries are usually provided with a protective feature such as a Positive Temperature Coefficient (PTC) element connected in series to the input/output circuit at the sealing end, which limits current flow in the event of external short-circuiting. Batteries that do not include the PTC element inside are normally provided with a PTC element or temperature fuse as outside circuit components. Further, a circuit for protecting the battery from overcharge and over discharge is an absolute requirement. In general, these constituent elements are all packed with the battery inside a pack case to form a battery pack.

However, battery packs using pack cases are not suited to portable electronic equipment that are re-modeled in short cycles, because the manufacturing cost of molding dies used in the resin molding of pack cases tends to be high, and the time required for designing new molding dies is relatively long. Moreover, battery packs with resin-molded outer cases also have limitations in making portable electronic equipment smaller and thinner because of the limitations on the moldable thickness in the resin molding process.

Furthermore, in order to prevent the user from disassembling a battery pack for wrong use or for satisfying curiosity, it must have a design that is hardly disassemblable, or a design that alerts the user that it has been disassembled. Taking account that the battery packs are used for portable electronic equipment, they also need to have a rigid structure that can withstand vibration or shocks in a falling accident, and a moisture resistance, particularly for the electronic circuit parts. In achieving the structure having a disassemblablity, a certain rigidity, and a moisture resistant, the idea has emerged that a battery may be united with a circuit substrate including a battery protective circuit by resin molding.

The applicants of the present invention have disclosed resin-molded battery packs in Japanese Laid-Open Patent Publications Nos. 2002-134077 and 2002-166447, in which a battery and a circuit substrate are connected by a connecting member to form an intermediate product, which is placed inside a die, and resin is filled around the intermediate product such as to expose external terminals formed on the substrate to the outside, to unite the battery with the substrate.

Japanese Laid-Open Patent Publication No. 2000-315483 discloses a structure in which a battery and a circuit substrate are connected by a connecting member and placed inside a die, and the circuit substrate is resin-sealed and fixed on the battery or its pack case (battery lid), or both the circuit substrate and the battery are resin-sealed.

According to the structure shown in the Japanese Laid-Open Patent Publication No. 2000-315483, connectors are provided to the tips of leads extended from the resin-sealed circuit substrate for male-female connection coupling with the equipment side connectors. This external connection structure will present no problem if the equipment is relatively large and offers enough space for accommodating the battery, but the battery packs to which the invention is directed are primarily designed for small equipment where battery accommodation space is scarce, and therefore cannot adopt such connection structure. The battery pack according to the present invention requires a connection structure with the equipment side in which, when the battery pack is accommodated in the battery accommodation space provided on the equipment side, contact terminals or probes in the equipment make pressure contact with external terminals exposed on the outside at preset locations of the battery pack.

In the case with a resin-molded battery pack containing a battery and a circuit substrate with external terminals, the outer dimensions of the battery pack and the locations of the external terminals must be precisely controlled, in order that the connection terminals on the equipment side in the battery accommodation space and the external terminals make pressure contact with each other with low contact resistance. If the dimensional precision is low, the contact resistance between the equipment-side connection terminals and external terminals becomes high, leading to malfunctions such as contact failure and voltage drop.

Referring now to FIG. 26, in a structure in which external terminals are formed on the circuit substrate that is arranged parallel to a sealing plate of the battery, it is particularly necessary to precisely control the dimension L from the bottom face of the battery pack 100 to the surface of the circuit substrate 102 on which the external terminals 103 are formed.

However, there tends to be variations in the height h of the battery 101, and because the circuit substrate 102 is connected with the battery 101 merely by a connecting member 104, its position and angle tend to vary. In a common battery pack structure, the battery 101 and the circuit substrate 102 are fixed in position by the pack case, so that the dimension L is controlled. However, in a structure in which the battery 101 and the circuit substrate 102 are united by resin molding, measures must be taken to absorb the variations in the height h of the battery 101 and to fix the circuit substrate 102 in position.

Because of the difficulty in achieving precise control of the height, the prior art resin-molded battery packs employ one of the aforementioned connection structure using connectors or other alternative structures including, for example, a structure in which biasing means such as a spring is provided in the battery accommodation space in the equipment to apply a bias to the battery pack toward the equipment-side connection terminals so as to absorb the variations in dimensions; and a structure in which the battery pack has external terminals exposed at one end on the longer side, which will make sliding contact with resilient connection terminals on the equipment side when the battery pack is inserted into the battery accommodation space of the equipment, so as to avoid contact failure. These structures, however, require an increased accommodation space for the battery pack on the equipment side and a larger number of components for the connection of the battery pack, prohibiting the miniaturization of such equipment. Namely, these structures are hardly applicable to small electronic equipment such as mobile phones that have limited space.

Furthermore, the resin molding for uniting a circuit substrate with a rechargeable battery must be performed under a low melting temperature of the filled resin and a low temperature of the die used, and a possibly small molding pressure so that the rechargeable battery and the electronic components are not thermally or mechanically affected. For example, favorable resin molding can be performed using hot melt resins that melt at low temperatures and are moldable with low temperature molding dies and low pressure.

Hot melt resin, however, has a low hardness after curing and is not suitable as an outer member exposed to the outside because it is susceptible to scratches and contaminant adhesions. It is suited for uniting the rechargeable battery and the circuit substrate, but for the outer material, a resin that has a relatively high hardness is more desirable for good appearance.

It is an object of the present invention to provide a battery pack of a rechargeable battery and a circuit substrate that are united by filling with resin, the battery pack being covered with a resin mold made of a resin material that is suited as an outer member at a given location exposed to the outside of the battery pack, and to provide a method for manufacturing a battery pack of a battery and a circuit substrate that are united by resin molding, with which the outer dimensions of the battery pack and the locations of external terminals are precisely controlled.

DISCLOSURE OF THE INVENTION

To achieve the above object, a battery pack according to a first aspect of the present invention comprises a rechargeable battery and a substrate at least having an external terminal that are electrically connected and united by solidified molded resin; and a resin mold member partly covering the battery and the substrate that is at least formed with an opening for exposing the external terminal to the outside. The resin used for uniting the rechargeable battery and the substrate is a resin that is moldable at a relatively low temperature so as not to cause adverse effects on the rechargeable battery or electronic components, which is not suitably applied, in terms of hardness and appearance, to parts that are exposed to the outside. The parts that will be on the outside are thus covered with another resin mold member so as to provide an ideal covering for the battery pack that uses a resin mold.

A battery pack according to a second aspect of the present invention comprises: an intermediate product formed of a rechargeable battery and a substrate that is united by a resin mold member, the battery includes elements for electromotive force that is accommodated in a bottomed tube-like battery case with its open end sealed by a sealing plate and the substrate being at least having an external terminal and connected onto the sealing plate of the battery such that the external terminal is on the outside; an upper resin mold at least formed with an opening for exposing the external terminal to the outside that is bonded to the intermediate product such as to cover the substrate and the resin mold member; a lower resin mold that is bonded to a bottom face of the battery case; and a sheet that is wound around side faces of the upper resin mold, the lower resin mold, and the battery case. Because the resin molds are provided to cover the resin mold member and the bottom face of the battery case after uniting, the rechargeable battery and the substrate by the resin molding, a resin that is different from the one used for the resin mold member and suitable as the outer member is used for the resin molds.

In the above structure, the upper resin mold and the lower resin mold may be coupled together by connection pieces that run along the sides of the battery, so that the battery pack has an enhanced rigidity because of the coupled upper and lower resin molds and the winding sheet wound around the connection pieces.

The upper and lower resin molds and the connection pieces may be integrally molded such that the connection pieces is bendable at right angles at hinges formed therewith, so as to collectively mold these parts and facilitate management or assembly of the components.

A method for manufacturing a battery pack according to a third aspect of the present invention comprises steps of: connecting a circuit substrate formed with an external terminal on one side to a rechargeable battery by a connecting member; arranging the circuit substrate such that the opposite side of the circuit substrate faces a sealing plate of the rechargeable battery with a gap therebetween to form an object to be resin packed; placing the object to be resin packed inside a die such that the rechargeable battery and the circuit substrate are in predetermined positions; filling the gap between the rechargeable battery and the circuit substrate with resin to form an intermediate product by uniting the rechargeable battery and the circuit substrate; and forming an outer covering such that at least the external terminal of the intermediate product is exposed to the outside.

According to the manufacturing method of the third aspect, the object to be resin packed in which and the circuit substrate is connected to the rechargeable battery is set inside the die such that the rechargeable battery and the circuit substrate are located in predetermined positions, and the gap between them is filled with resin, whereby the rechargeable battery and the circuit substrate are united into an intermediate product that has a controlled dimension from the bottom face of the rechargeable battery to the surface of the circuit substrate where an external terminal is formed. An outer covering is formed onto this intermediate product, whereby a battery pack that is hardly disassemblable and has a rigid structure is obtained.

A method for manufacturing a battery pack according to a fourth aspect of the present invention includes the steps of: connecting a circuit substrate formed with an external terminal on one side thereof to a flat prismatic rechargeable battery on a sealing plate side thereof by a connecting member; arranging the circuit substrate so that the opposite side of the circuit substrate faces the sealing plate of the rechargeable battery with a gap therebetween to form an object to be resin packed; placing the object to be resin packed inside a die such that a bias is applied thereto so that either one of the sealing plate and a bottom face of the rechargeable battery abuts on a wall that defines the position of the battery and is formed inside the die; arranging the circuit substrate held by vacuum suction on a wall that defines the position of the substrate and is formed inside the die parallel to the wall that defines the position of the battery; filling the gap between the rechargeable battery and the circuit substrate to form an intermediate product by uniting the rechargeable battery and the circuit substrate; and forming an outer covering by a secondary molding process such that at least the external terminal of the intermediate product is exposed to the outside and that the outer covering has uniform external dimensions.

According to this manufacturing method of the fourth aspect, when a bias is applied so that the bottom face side of the rechargeable battery abuts on the wall that defines the position of the battery, while the circuit substrate is held by vacuum suction on the wall that defines the position of the substrate, and the gap therebetween is filled with resin to unite them, then variations in the height of the rechargeable battery and in the position of the circuit substrate are absorbed by variable height of the filled resin, so that the height of the intermediate product is made constant. An outer covering is formed onto this intermediate product such that predetermined parts including the external terminal are exposed to the outside, whereby a battery pack whose external terminal is precisely positioned and which is hardly disassemblable and has a rigid structure is obtained. Alternatively, if the gap between the rechargeable battery and the circuit substrate is filled with resin to unite them while the battery is biased so that its sealing plate side abuts on the wall that defines the position of the battery, and the circuit substrate is held by vacuum suction on the wall that defines the position of the substrate, then the gap between the battery and circuit substrate coupled together by resin is made constant. There will be variations in the height of the intermediate product because of variations in the battery height, but these variations are absorbed by variable thickness of the outer covering on the bottom face side of the rechargeable battery when performing the secondary molding for forming the outer covering that has uniform external dimensions.

A method for manufacturing a battery pack according to a fifth aspect of the present invention includes the steps of: connecting a circuit substrate formed with an external terminal on one side thereof to a flat prismatic rechargeable battery on a sealing plate side thereof by a connecting member; arranging the circuit substrate so that the opposite side of the circuit substrate faces the sealing plate of the rechargeable battery with a gap therebetween to form an object to be resin packed; placing the object to be resin packed inside a die such that a bias is applied so that either one of the sealing plate and a bottom face of the rechargeable battery abuts on a wall that defines the position of the battery and is formed inside the die; arranging the circuit substrate such that a bias is applied so that both ends of the circuit substrate abut on a wall that defines the position of the substrate and is formed parallel to the wall that defines the position of the battery; filling the gap between the rechargeable battery and the circuit substrate with resin to form an intermediate product by uniting the rechargeable battery and the circuit substrate; and forming an outer covering by a secondary molding process such that at least the external terminal of the intermediate product is exposed to the outside and that the outer covering has uniform external dimensions.

According to this manufacturing method, when the circuit substrate is biased so as to abut on the wall that defines the position of the substrate formed inside the die, while the rechargeable battery is biased so that its sealing plate side abuts on the wall that defines the position of the battery, then their positions are set so that the gap therebetween is made constant, and they are united by filling the gap therebetween with resin. There are variations in the height of the thus formed intermediate product because of variations in the height of the battery. These height variations are absorbed by variable thickness of the outer covering on the bottom side of the battery when performing the secondary resin molding for forming the outer covering that has uniform external dimensions. Alternatively, if the gap between the rechargeable battery and the circuit substrate is filled with resin to unite them while the circuit substrate is biased so as to abut on the wall that defines the position of the substrate in the case where the battery is biased so that its bottom face side abuts on the wall that defines the position of the battery, then the variations in the height of the battery and in the position of the circuit substrate which is not restricted are absorbed by variable height of filled resin, whereby the intermediate product always has a constant height.

A method for manufacturing a battery pack according to a sixth aspect of the present invention includes the steps of: connecting a circuit substrate formed with an external terminal on one side thereof to a flat prismatic rechargeable battery on a sealing plate side thereof by a connecting member; arranging the circuit substrate so that the opposite side of the circuit substrate faces the sealing plate of the rechargeable battery with a gap therebetween to form an object to be resin packed; placing the object to be resin packed inside a die such that a bias is applied so that either one of the sealing plate and a bottom face of the rechargeable battery abuts on a wall that defines the position of the battery and is formed inside the die; arranging the circuit substrate such that one edge of the circuit substrate fits in a groove that defines the position of the substrate and is formed parallel to the wall that defines the position of the battery; filling a gap between the rechargeable battery and the circuit substrate with resin to form an intermediate product by uniting the rechargeable battery and the circuit substrate; and forming an outer covering by a secondary molding process such that at least the external terminal of the intermediate product is exposed to the outside and that the outer covering has uniform external dimensions.

According to this manufacturing method of the sixth aspect, when the wall that defines the position of the battery and the groove that defines the position of the substrate are formed parallel to each other inside the die, so that the circuit substrate is positioned inside the die with its one edge fitted in that groove and the battery is biased so that its bottom face abuts on the wall, then, when the gap between the rechargeable battery and the circuit substrate is filled with resin to unite them, the position of the circuit substrate is restricted and variations in the height of the battery are absorbed by variable height of filled resin, and the resultant intermediate product always has a constant height. An outer covering is formed onto this intermediate product such that predetermined parts including the external terminal are exposed to the outside, whereby a battery pack whose external terminal is precisely positioned and which is hardly disassemblable and has a rigid structure is obtained. Alternatively, if the circuit substrate is biased so as to abut on the wall that defines the position of the substrate, while the rechargeable battery is biased so that its sealing plate side abuts on the wall that defines the position of the battery, then the gap between the rechargeable battery and the circuit substrate is made constant, and by filling this gap with resin, the rechargeable battery and the circuit substrate are united. There will be variations in the height of the intermediate product because of variations in the battery height. These variations in the height are absorbed by variable thickness of the outer covering on the bottom face side of the rechargeable battery when performing the secondary molding for forming the outer covering that has uniform external dimensions.

A method for manufacturing a battery pack according to a seventh aspect of the present invention includes the steps of: arranging a circuit substrate formed with an external terminal on one side thereof on a sealing plate side of a flat prismatic rechargeable battery with a gap therebetween; connecting the circuit substrate to the rechargeable battery by a resilient connecting member that biases the circuit substrate in a direction away from the rechargeable battery to form an object to be resin packed; placing the object to be resin packed inside a die against the biasing force of the connecting member, the die having an inner space that restricts a dimension from the bottom face of the rechargeable battery to one surface of the circuit substrate where the external terminal is formed; filling a gap between the rechargeable battery and the circuit substrate with resin to form an intermediate product by uniting the rechargeable battery and the circuit substrate; and forming an outer covering such that at least the external terminal of the intermediate product are exposed to the outside.

According to this manufacturing method of the seventh aspect, since the object to be resin packed, in which the circuit substrate is biased in a direction away from the rechargeable battery by the connecting member, is placed inside the die formed with the inner space that restricts the dimension from the bottom face of the rechargeable battery to one surface of the circuit substrate where the external terminal is formed, the connecting member presses the rechargeable battery and the circuit substrate against the opposite wall of the inner space by its resilience so as to absorb variations in the height of the rechargeable battery as well as to fix the circuit substrate in a constant position, whereby the dimension from the bottom face of the battery to the circuit substrate is kept constant. When the gap between the rechargeable battery and the circuit substrate is filled with resin in this state, they are united and the resultant intermediate product has a uniform dimension from the bottom face of the rechargeable battery to the surface of the circuit substrate where the external terminal is formed. The intermediate product is then provided with an outer covering to be complete as a battery pack.

In any of the above manufacturing methods, the sealing plate of the rechargeable battery is provided with an undercut portion that protrudes toward the circuit substrate, so that resin filled in the gap between the rechargeable battery and the circuit substrate firmly engages with the undercut portion and bond to the rechargeable battery, whereby a hardly disassemblable and rigid structure is obtained.

The outer covering provided to the intermediate product includes the following that are formed by a secondary molding process: an upper mold covering one surface of the circuit substrate where the external terminal is formed and the sealing plate of the rechargeable battery while exposing at least the external terminal to the outside; a lower mold formed on the bottom face of the rechargeable battery to a predetermined height; and a connecting mold part that couples the upper mold and the lower mold along the shorter sides of the rechargeable battery. A sheet is wound around to cover the side faces of the battery, part of the side faces of the upper mold and the lower mold, and the connecting mold part. Thereby, a thin battery pack is obtained, whose thickness is the sum of the thickness of the rechargeable battery and that of the sheet. The connecting mold part should preferably have a cross section that conforms to part of a rectangle that surrounds the circular arcs at both ends of the oval cross section of the rechargeable battery, so that the width of the battery pack will be the sum of the width of the rechargeable battery and the thickness of the sheet, i.e., there will be no unnecessary increase in the size of the battery. Also, if the connecting mold part is formed only on one side of that rectangle surrounding the circular arcs, then the battery pack will have an asymmetric cross section, which will restrict the direction in which it is loaded into equipment, and the circular arc side of the battery pack will fit in a rounded shape formed at a corner of a battery accommodation case inside the equipment.

The outer covering is formed by sheathing the intermediate product with a tube-like member or a bottomed tube-like member having a predetermined height, and resin filling in the open end on one or both of the external terminal side of the circuit substrate and the bottom face side of the rechargeable battery such that predetermined parts including the external terminal are exposed to the outside. Thereby, the intermediate product will entirely be covered with ease while the predetermined parts including the external terminal are exposed to the outside, because resin molding need only be performed for the open end.

Further, the outer covering is formed of resin such as to cover the entire surface of the intermediate product except for predetermined parts including the external terminal, so that the intermediate product is covered in an air/liquid tight manner and the battery pack has excellent moisture resistance properties.

Parts of the dies used for the primary and secondary molding that will make contact with exposed active parts of the object to be resin packed or the intermediate product should preferably be provided with an insulation coating, so as to prevent short circuits or leaks during the resin molding or the process of providing the outer covering.

BRIEF DESCRIPTION OF THE DRAWINGS

FIG. 6A and FIG. 6B illustrate the structure of a rechargeable battery according to another embodiment, FIG. 6A being a plan view and FIG. 6B being a cross sectional view on the side of a sealing plate;

FIG. 7A and FIG. 7B illustrate the above rechargeable battery with a temperature fuse attached thereto, FIG. 7A being a plan view and FIG. 7B being a cross sectional view on the side of the sealing plate;

FIG. 9A is a schematic view for explaining how resin is filled according to a first manufacturing method, and FIG. 9B is a schematic view for explaining another embodiment of the resin filling according to the same method;

FIG. 19A is a schematic view for explaining how resin is filled according to a fourth manufacturing method, and FIG. 19B is a schematic view for explaining another embodiment of the resin filling according to the same method;

BEST MODE FOR CARRYING OUT THE INVENTION

Preferred embodiments of the present invention will be hereinafter described with reference to the accompanying drawings for an understanding of the invention. It should be understood that the following embodiments of the invention are merely given as examples and should not limit the technical scope of the invention.

The present embodiment shows one example of a battery pack employing a flat prismatic lithium ion rechargeable battery applied to a mobile phone. Battery packs for mobile phones need to be small, light-weight, and thin, and in addition, they are desired to have a high energy density in accordance with high functionality, a high mechanical strength to withstand impacts caused by a falling accident which is inevitable with portable equipment, a structure that does not allow easy disassembling, and safety features for protecting the rechargeable battery from short circuits, overcharge, and high temperature. The battery pack described below satisfies all these requirements.

Figure 1:
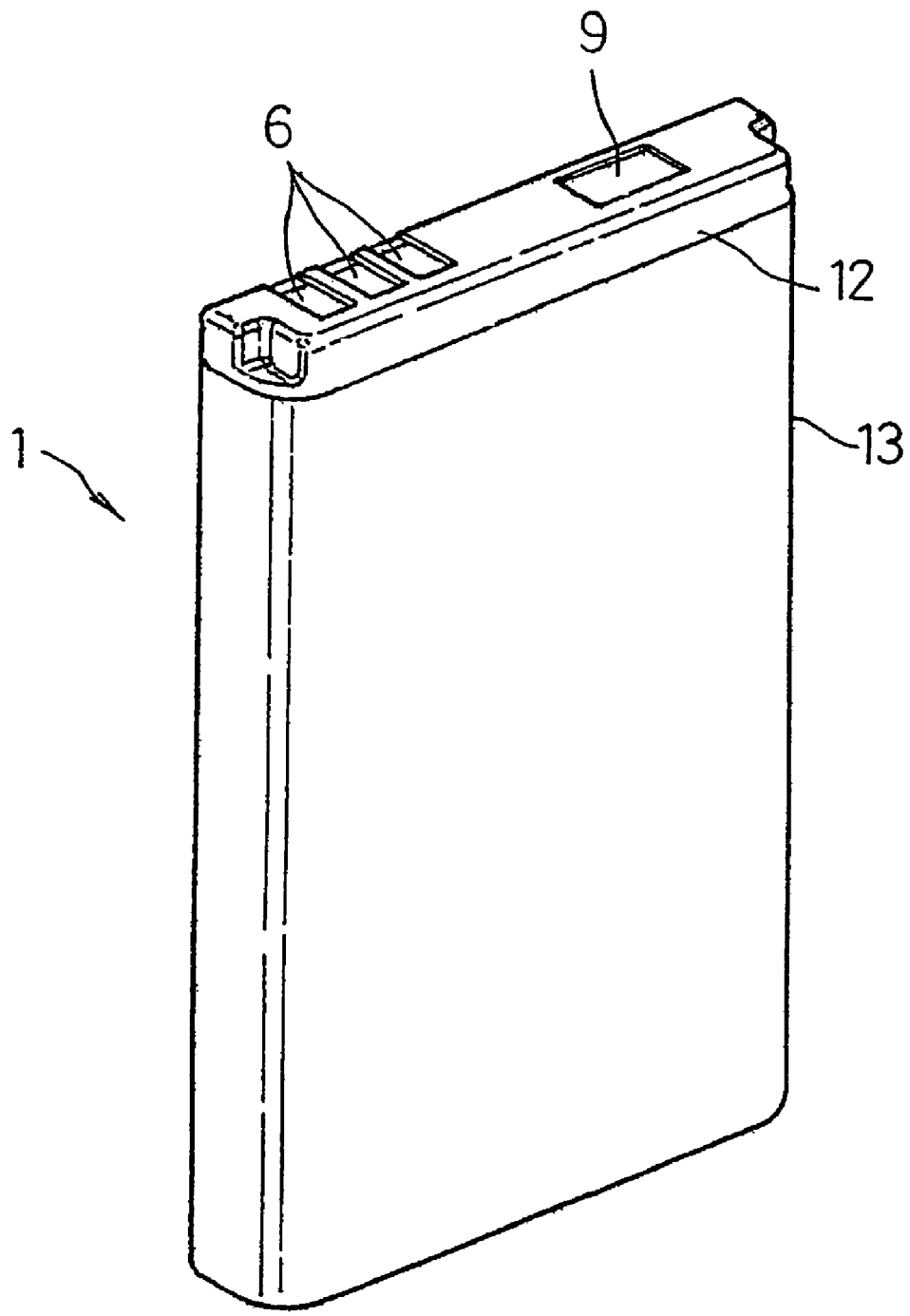
FIG. 1 is a perspective view illustrating an external appearance of a battery pack according to one embodiment of the invention.
Figure 2:
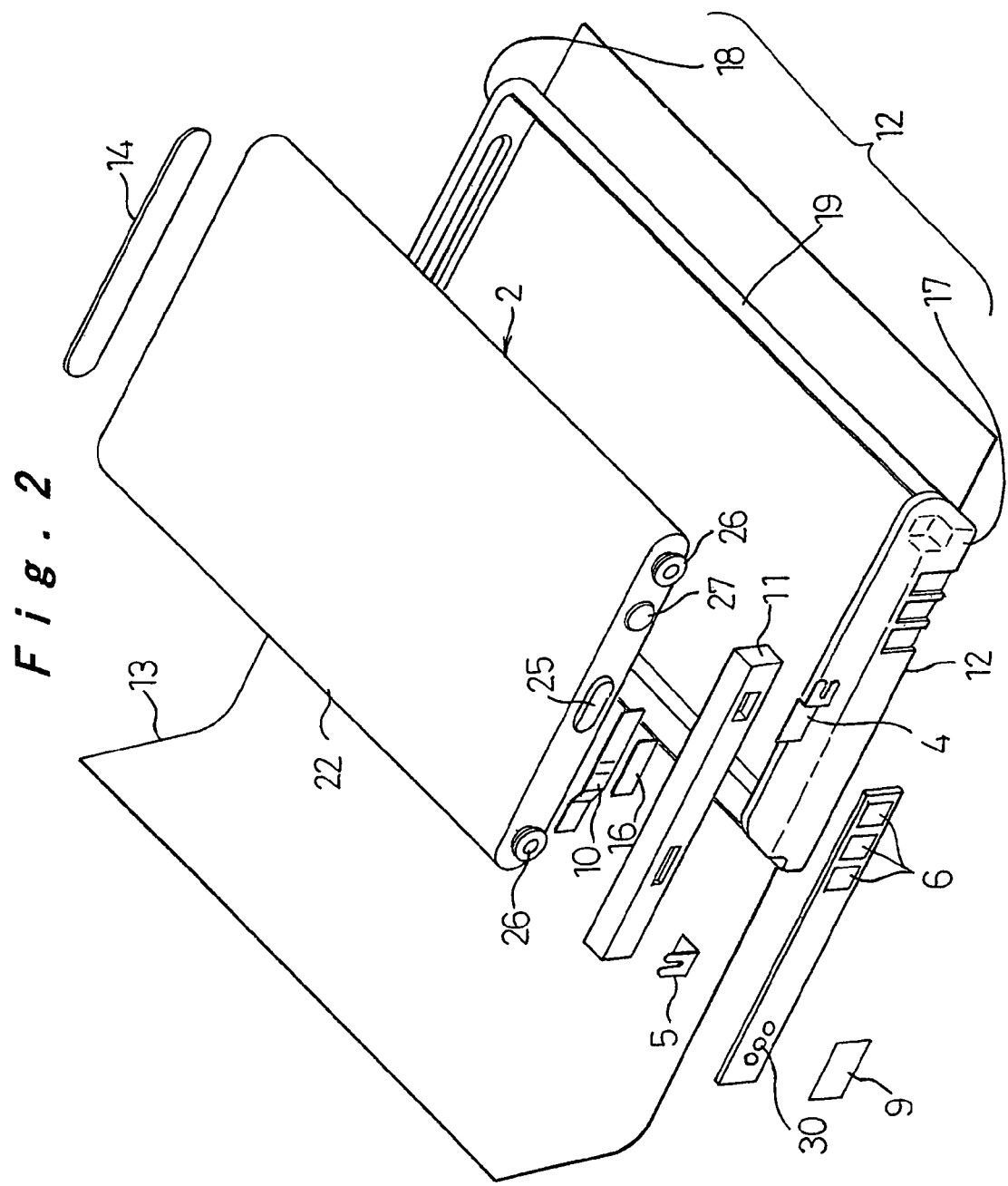
FIG. 2 is an exploded perspective view illustrating various constituent elements of the battery pack.

FIG. 1 is an outer representation of the battery pack 1 according to this embodiment. On one end face of the flat battery pack are exposed external terminals 6 consisting of a positive terminal, a negative terminal, and a temperature detecting terminal, and a water ingress label 9 bonded onto a test terminal 30 which will be described later, in an asymmetrical arrangement. FIG. 2 is an exploded view of this battery pack 1 showing its constituent elements. These elements and a manufacturing method of the battery pack 1 will be described below in detail.

Figure 3A:
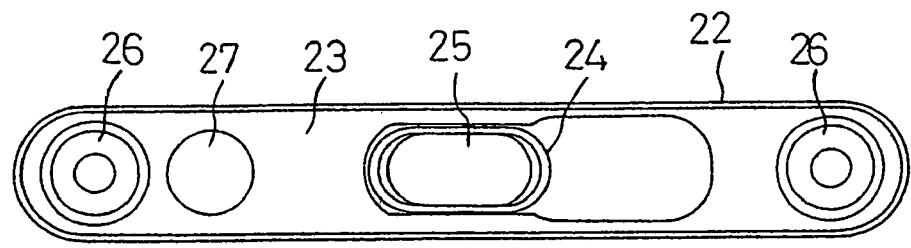
FIG. 3A is a plan view illustrating the structure of a rechargeable battery.
Figure 3B:
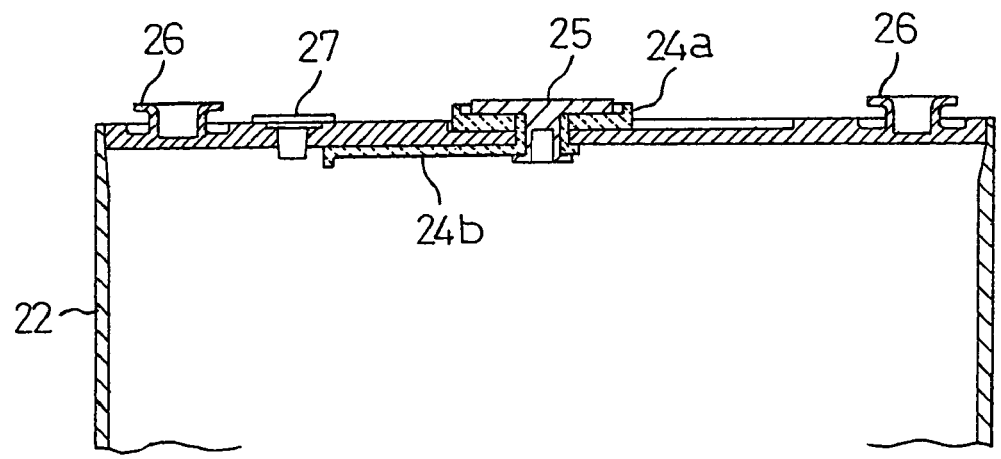
FIG. 3B is a cross section of the rechargeable battery on the side of a sealing plate.

The lithium ion rechargeable battery (hereinafter rechargeable battery) 2 accommodates elements for electromotive force in a bottomed tube-like aluminum case 22 having an oval cross section as can be seen from FIGS. 3A to 3C, the open end of the case being sealed with a sealing plate 23 by laser welding. The sealing plate 23 is joined to the case 22 and serves as the battery's positive electrode; the battery's negative electrode 25 is electrically insulated from the sealing plate 23 by an upper gasket 24a and a lower gasket 24b and protruded at the center of the sealing plate 23. On both sides of the sealing plate 23 are mushroom-shaped engaging protrusions (undercut portions) 26, 26 that are provided by pressing-forming. Reference numeral 27 denotes a plug for closing a hole for pouring electrolyte; after the injection of electrolyte into the case 22, the hole is closed by the plug 27, which is then welded to the sealing plate 23.

The engaging protrusions 26 are formed into the mushroom shape as shown by first pressing the sealing plate 23 to provide cylindrical projections at predetermined positions on the sealing plate 23 and spreading the tops of the projections by pressing. Pressing is not the only way to form the engaging protrusions 26; they may be formed by welding mushroom-shaped or inverted L shape members onto the sealing plate, as will be described later.

Figure 3C:
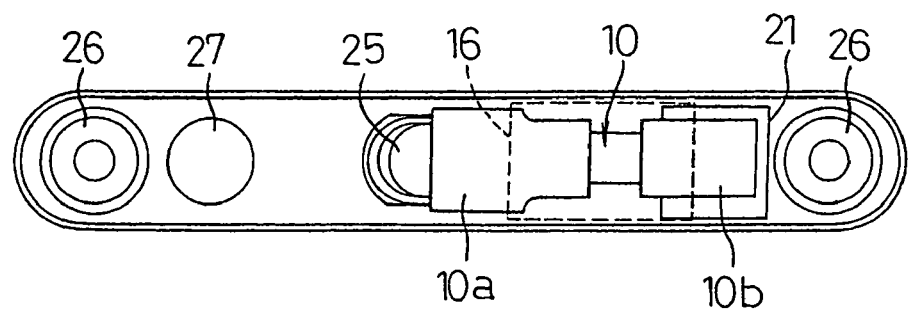
FIG. 3C is a plan view illustrating the rechargeable battery to which a temperature fuse is attached.

To the negative electrode 25 of this rechargeable battery 2 is welded a connection piece 10a at one end of a temperature fuse 10 as shown in FIG. 3C. A heat insulation sheet 16 is affixed upon the upper face of the temperature fuse 10 as indicated by broken lines, so as to prevent fusion of the temperature fuse 10 during the resin filling process to be described later. A connection piece 10b at the other end of the temperature fuse 10 is placed upon an insulating paper 21 affixed on the sealing plate 23 and bonded to one end of a negative lead plate 5 to be described later by spot welding. The temperature fuse 10 and the rechargeable battery 2 are bonded together by heat conductive adhesive applied therebetween, so that the temperature fuse 10 is heat-coupled to the rechargeable battery 2.

Figure 4A:
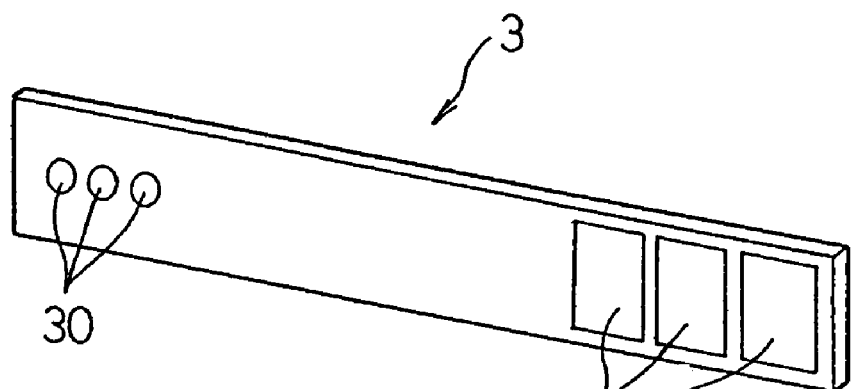
FIG. 4A is a perspective view illustrating the outer-side structure of a circuit substrate.
Figure 4B:
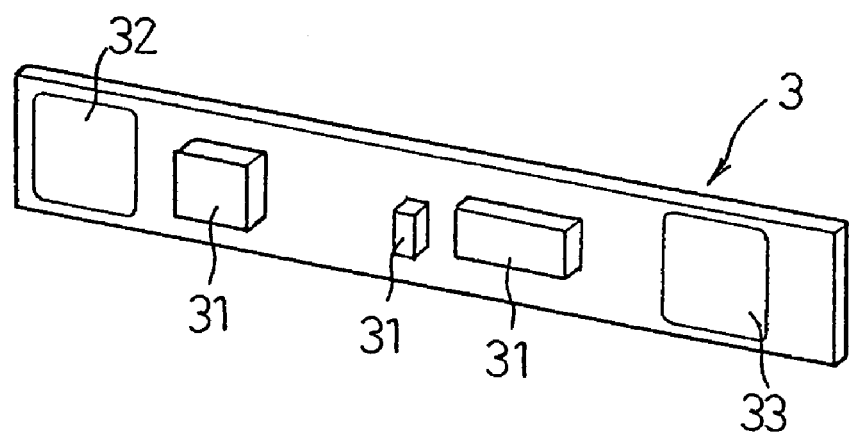
FIG. 4B is a perspective view illustrating the inner-side structure of the circuit substrate.

The circuit substrate 3 includes a circuit for protecting the rechargeable battery 2 from overcharge, over discharge, and over current; on one side that is on the outside are formed the aforementioned external terminals 6 and the test terminal 30 as shown in FIG. 4A, and on the other side that is on the side of the rechargeable battery 2 are mounted electronic components 31 such as ICs and positive and negative solder lands 32, 33 at both ends for the connection with the rechargeable battery 2, as shown in FIG. 4B. Incidentally, circuit patterns and through holes on the circuit board 3 are not shown in these drawings.

Figure 4C:
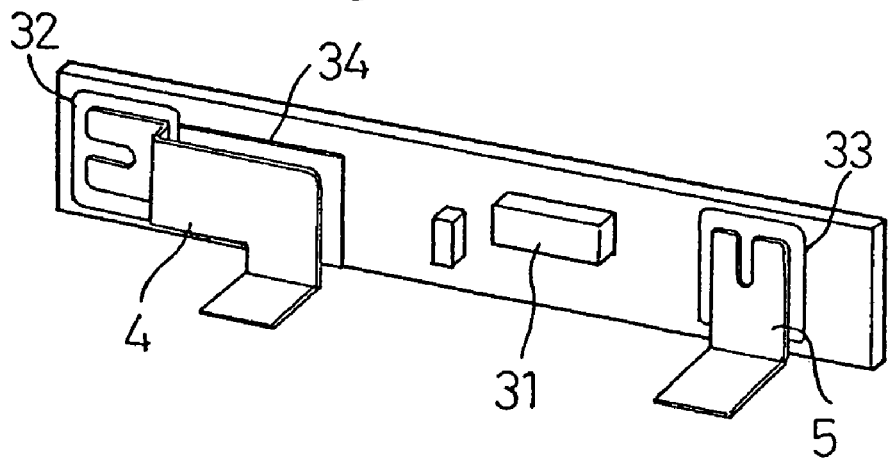
FIG. 4C is a perspective view illustrating the circuit substrate to which a lead plate is attached.

As shown in FIG. 4C, one end of a positive lead plate (connecting member) 4 is soldered to the positive solder land 32, with a piece of insulating paper 34 interposed between the lead plate 4 and the electronic components 31, and one end of the negative lead plate (connecting member) 5 is soldered to the negative solder land 33.

Figure 5A:
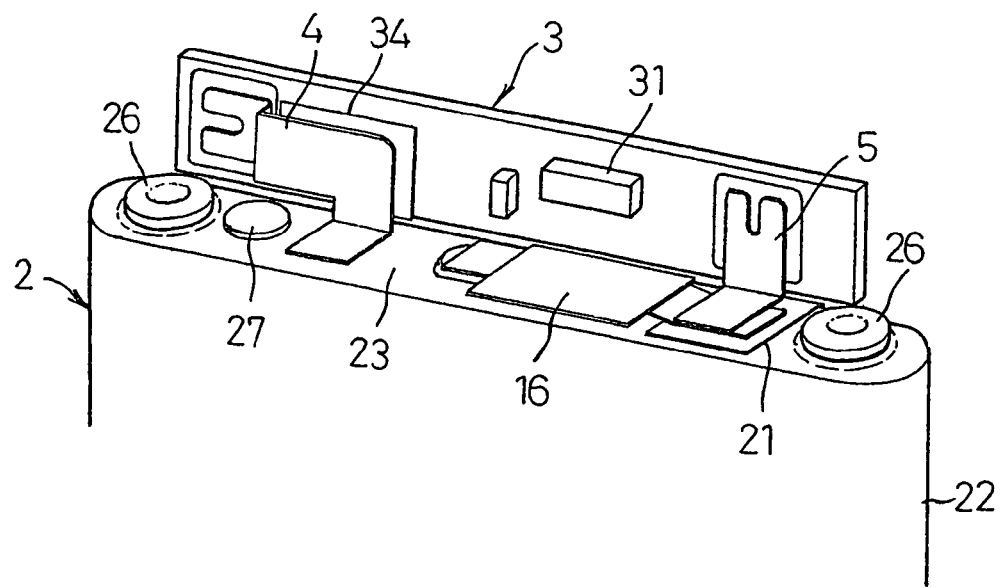
FIG. 5A is a perspective view illustrating how the circuit substrate is connected to the rechargeable battery.
Figure 5B:
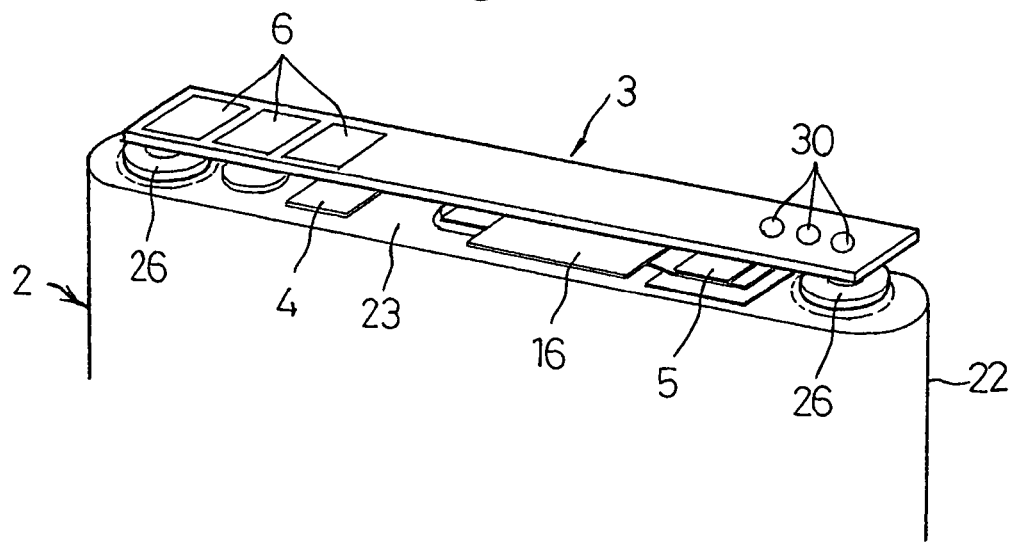
FIG. 5B is a perspective view illustrating how the circuit substrate is attached to the rechargeable battery.

After establishing these connections, the circuit substrate 3 is set relative to the rechargeable battery 2 as shown in FIG. 5A such that the other end of the positive lead plate 4 is spot-welded on the face of the sealing plate 23, and the other end of the negative lead plate 5 is spot-welded on the connection piece 10b of the temperature fuse 10. The circuit substrate 3 is orthogonal to the face of the sealing plate 23 in this connection state; the positive and negative lead plates 4, 5 are then bent over so that the circuit substrate 3 is substantially parallel to the sealing plate 23 with a certain gap therebetween, as shown in FIG. 5B. The rechargeable battery 2 with the circuit substrate 3 thus connected thereto constitutes an object 7 to be resin packed shown in FIG. 20A.

This object 7 to be resin packed includes the following safety vent structure. The rivet 25 serving as a negative electrode is mounted in the center of the sealing plate 23 that is coupled to the case 22 and forms the positive electrode, with the upper and lower gaskets 24a, 24b providing insulation therebetween, as shown in FIGS. 6A and 6B. Part of the sealing plate 23 is formed of a clad material of thin sheets, and an outlet 20a is formed in the portion of the clad material so as to form a safety vent 20. The safety vent 20 prevents explosion of the battery case 22 in the event of an abnormal increasing of internal pressure inside the case 22 due to a temperature rise or the like by breaking the thin sheet portion and letting out gas from the outlet 20a. The plug 27 in the sealing plate 23 closes an opening for pouring electrolyte into the case 22; after the injection of electrolyte, it is press-fitted into the opening in the sealing plate 23 and welded thereto. Eyelets or engaging members 26 are welded from both sides of the sealing plate 23.

A piece of porous resin sheet 40 is bonded on the sealing plate 23 of the rechargeable battery 2 to cover the outlet 20a of the safety vent 20, while a piece of insulating paper 21 is bonded upon the plug 27, as shown in FIG. 7A and FIG. 7B. A connection piece 10a at one end of a temperature fuse 10 is welded to the rivet 25. A piece of heat insulation sheet 16 is affixed upon the temperature fuse 10, so as to prevent fusion of the temperature fuse 10 during the resin filling process to be described later. A connection piece 10b at the other end of the temperature fuse 10 is placed upon the insulating paper 21 and bonded to one end of the negative lead plate 5 to be described later by spot welding. Heat conductive adhesive is applied between the temperature fuse 10 and the sealing plate 23, so that heat from the rechargeable battery 2 is well conducted to the temperature fuse 10.

Figure 8A:
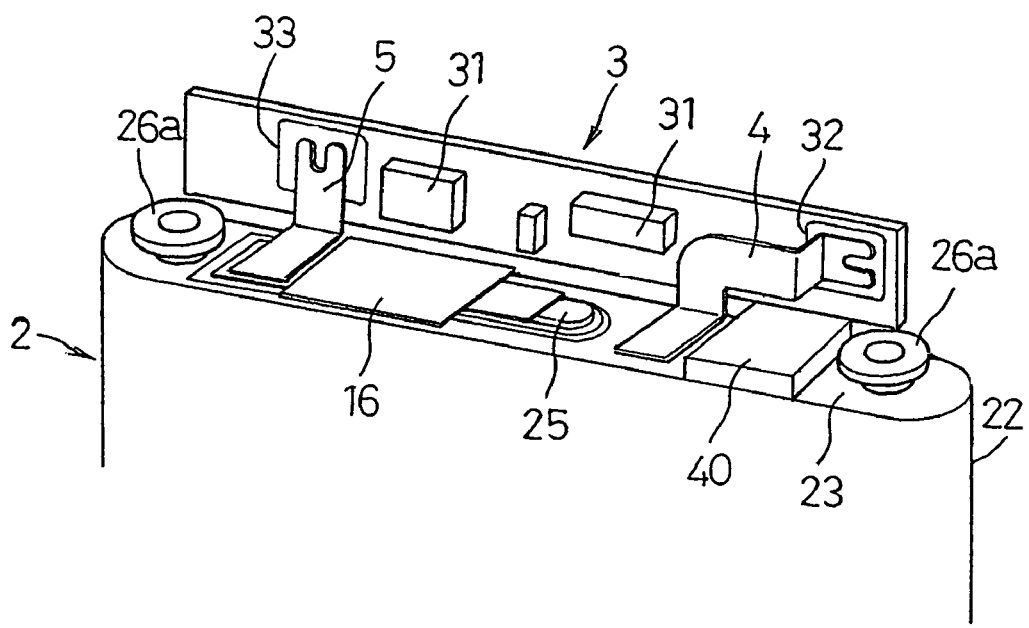
FIG. 8A is a perspective view illustrating how the circuit substrate is connected to the rechargeable battery.
Figure 8B:
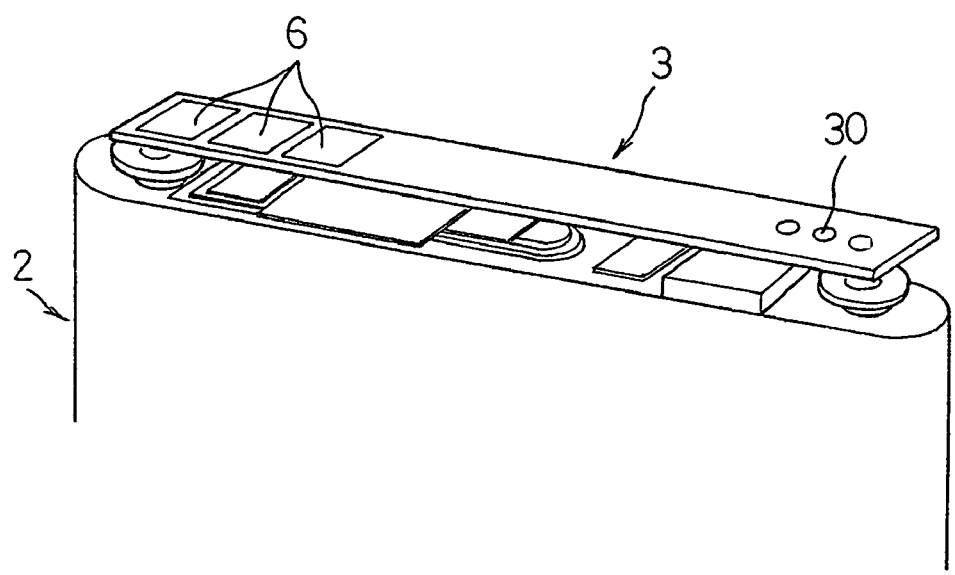
FIG. 8B is a perspective view illustrating how the circuit substrate is attached to the rechargeable battery.

To this rechargeable battery 2 with the temperature fuse 10 attached thereto are connected a positive lead plate 4 and a negative lead plate 5 of a circuit substrate 3, as shown in FIG. 8A. The circuit substrate 3 includes a circuit for protecting the rechargeable battery 2 from overcharge, over discharge, and over current; on one side that is on the outside are formed the aforementioned external terminals 6 and the test terminal 30, and on the other side are mounted electronic components 31 such as ICs and positive and negative solder lands 32, 33 at both ends for the connection with the rechargeable battery 2. One end of the positive lead plate 4 is soldered to the positive solder land 32, and one end of the negative lead plate 5 is soldered to the negative solder land 33. The other end of the positive lead plate 4 and the other end of the negative lead plate 5 are spot-welded on the face of the sealing plate 23 and on the connection piece 10b of the temperature fuse 10, respectively. The circuit substrate 3 is orthogonal to the face of the sealing plate 23 in this connection state; the positive and negative lead plates 4, 5 are then bent over so that the circuit substrate 3 is parallel to the sealing plate 23 with a certain gap therebetween, as shown in FIG. 8B. The circuit substrate 3 is thus connected to the rechargeable battery 2 to form the object 7 to be resin packed shown in FIG. 20A.

The gap between the rechargeable battery 2 and the circuit substrate 3 of the object 7 to be resin packed is filled with resin to integrate them. It is important to ensure that the height H from the bottom face of the rechargeable battery 2 to the surface of the circuit substrate 3 where the external terminals 6 are formed is precisely controlled in the resin molding process; the following is a description of first to fourth manufacturing methods in which this is achieved.

(First Manufacturing Method)

As shown in FIG. 9A, a lower die 36 of the primary molding die 35 includes a movable part 41 that is movable toward a stationary part 42 by biasing means 45, and the movable part 41 is provided with a vacuum suction part 43. The object 7 to be resin packed (only the rechargeable battery 2 and the circuit-substrate 3 being illustrated in FIG. 9A) is placed inside the lower die 36 with the movable part 41 retracted, which is then moved forward for the positioning of the rechargeable battery 2, with its bottom face being pressed against the inner wall of the stationary part 42. The circuit substrate 3, on the other hand, makes tight contact with the wall of the vacuum suction part 43 by vacuum suction and is kept in position.

The height H from the bottom face of the rechargeable battery 2 to the surface of the circuit substrate 3 where the external terminals 6 are formed varies because of variations in the height h of the rechargeable battery 2 and in the position of the circuit substrate 3; with the above structure, however, the circuit substrate 3 is fixed in position by vacuum suction, while the movable part 41 changes its forward position in accordance with the height h of the rechargeable battery 2, so that the gap G between the rechargeable battery 2 and the circuit substrate 3 placed inside the lower die 36 is variable, whereby the height H from the bottom face of the rechargeable battery 2 to the surface of the circuit substrate 3 where the external terminals 6 are formed is made constant.

FIG. 9B shows a modified structure of the lower die 36a of the primary molding die 35 for achieving the positioning of the rechargeable battery 2 and the circuit substrate 3 in the resin molding process of the object 7 to be resin packed. The circuit substrate 3 makes tight contact with a wall 75 that defines the position of the substrate by vacuum suction, while the rechargeable battery 2 is biased with pressing shafts 85 and biasing means 76 so that its both shoulders abut on a wall 77 that defines the position of the battery. Because the gap G between the rechargeable battery 2 and the circuit substrate 3 is maintained constant in this structure, the variations in the height h of the rechargeable battery 2 equal to the variations in the height H4 from the bottom face of the battery 2 to the surface of the circuit substrate 3 where the external terminals 6 are formed, but these variations are absorbed in the secondary molding process to be described later.

Figure 10:
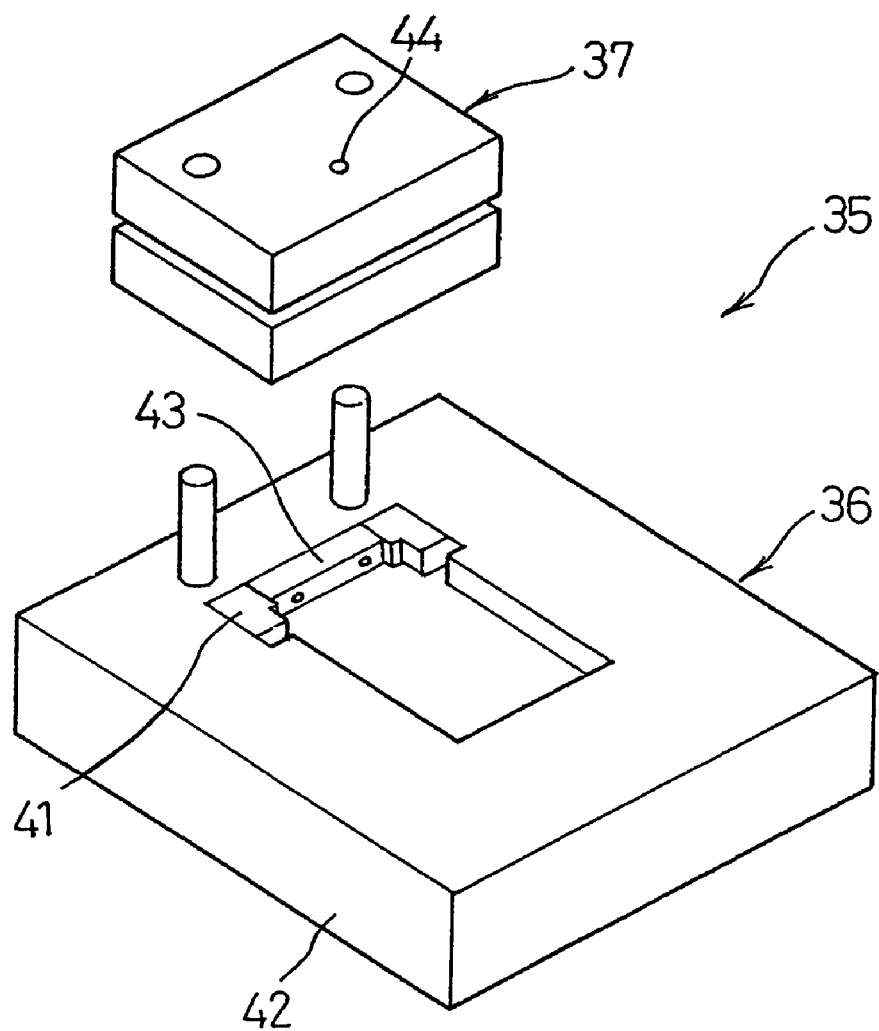
FIG. 10 is a perspective view illustrating the structure of a primary molding die.
Figure 11:
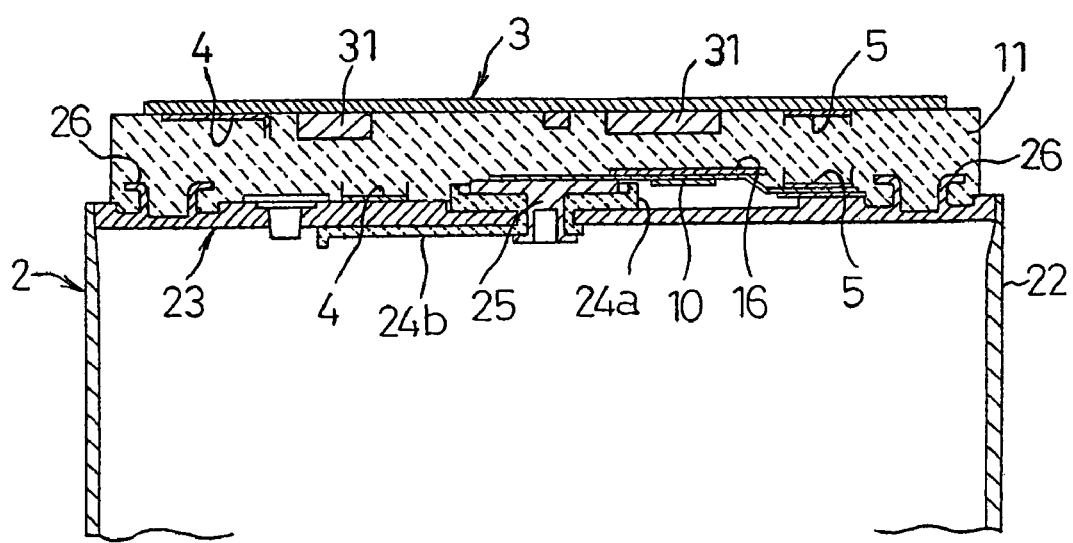
FIG. 11 is a cross-sectional view illustrating a resin mold formed by the primary molding.

An upper die 37 shown in FIG. 10 is lowered onto the lower die 36 or 36a in which the rechargeable battery 2 and the circuit substrate 3 are placed in position, and resin is injected from a gate 44 provided in the upper die 37 into the gap between the rechargeable battery 2 and the circuit substrate 3. The injected resin surrounds the electronic components 31 and the positive and negative lead plates 4, 5 on the circuit substrate 3 and bonds to the circuit substrate 3, as well as surrounds the undercut portions of the engaging protrusions 26 on the sealing plate 23 of the rechargeable battery 2 and bonds to the sealing plate 23, thereby forming a primary mold 11, as shown in FIG. 11. Hot melt resins are preferably used because they melt at a temperature that does not adversely affect the electronic components 31, rechargeable battery 2, and temperature fuse 10, and cure as the temperature lowers.

Even though the resin melts at a relatively low temperature, it is still as hot as 200° C.; if it contacts the temperature fuse 10 whose fusion temperature is set to 104° C., it may cause fusion of the temperature fuse 10 and destroy the function of the battery pack 1. Countermeasures that have been shown in other patent applications include providing a heat shield between the temperature fuse 10 and the resin using a heat insulation sheet, and arranging the temperature fuse 10 at a location where it does not directly contact resin; in this embodiment, a heat insulation sheet 16 is affixed upon the temperature fuse 10 as mentioned above so as to reduce heat conduction from the resin to the fuse 10. Alternatively, this trouble may be resolved by forming a portion of the primary molding die 35 where the temperature fuse 10 will be located with a material having good heat conductivity (such as aluminum) so as to diffuse heat from the resin into the die and reduce heat conduction to the temperature fuse 10.

The object 7 to be resin packed has its active parts connected to both positive and negative terminals of the rechargeable battery 2 exposed on the outside; thus, a portion of the primary molding die 35 to which the exposed active parts may contact is provided with insulation coating by an alumina or fluorine resin coating process so as to prevent short circuits or leaks when the object 7 is placed in the die 35. Alternatively, the entire die may be formed of aluminum and provided with alumite coating at necessary locations for the insulation purpose, whereby heat conductivity is improved and thermal effects of resin on the temperature fuse 10 are reduced.

Figure 20A:
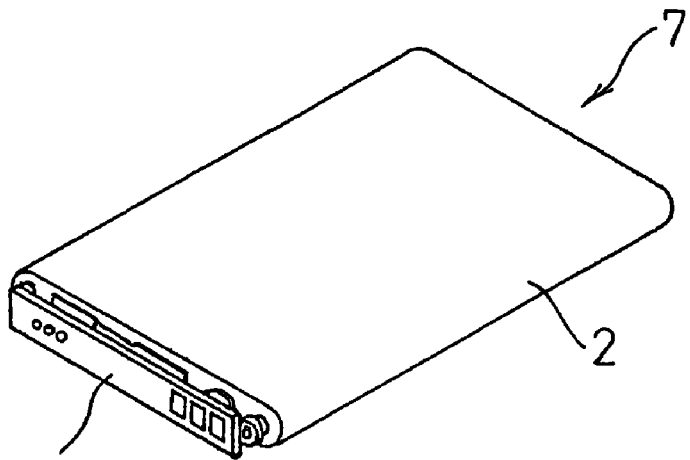
FIG. 20A to FIG. 20C are perspective views illustrating a formation process of production steps in chronological order.
Figure 20B:
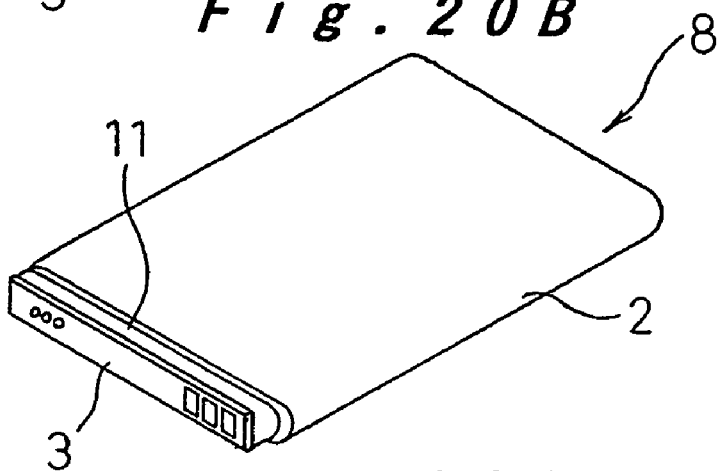

After curing the filled resin, the upper die 37 is lifted, vacuum suction stopped, and the movable part 41 or biasing means 76 is retracted, an intermediate product 8 shown in FIG. 20B, which consists of the rechargeable battery 2 and the circuit substrate 3 united by a primary mold 11 formed by the cured resin as shown in FIG. 11, is taken out from the lower mold 36. This intermediate product 8 is made into a battery pack 1 by providing an outer covering.

The outer covering is provided by a secondary molding process and an affixing process of a winding sheet prior to the secondary battery, an insulator 14 is attached to the bottom face of the rechargeable battery 2.

Figure 12:
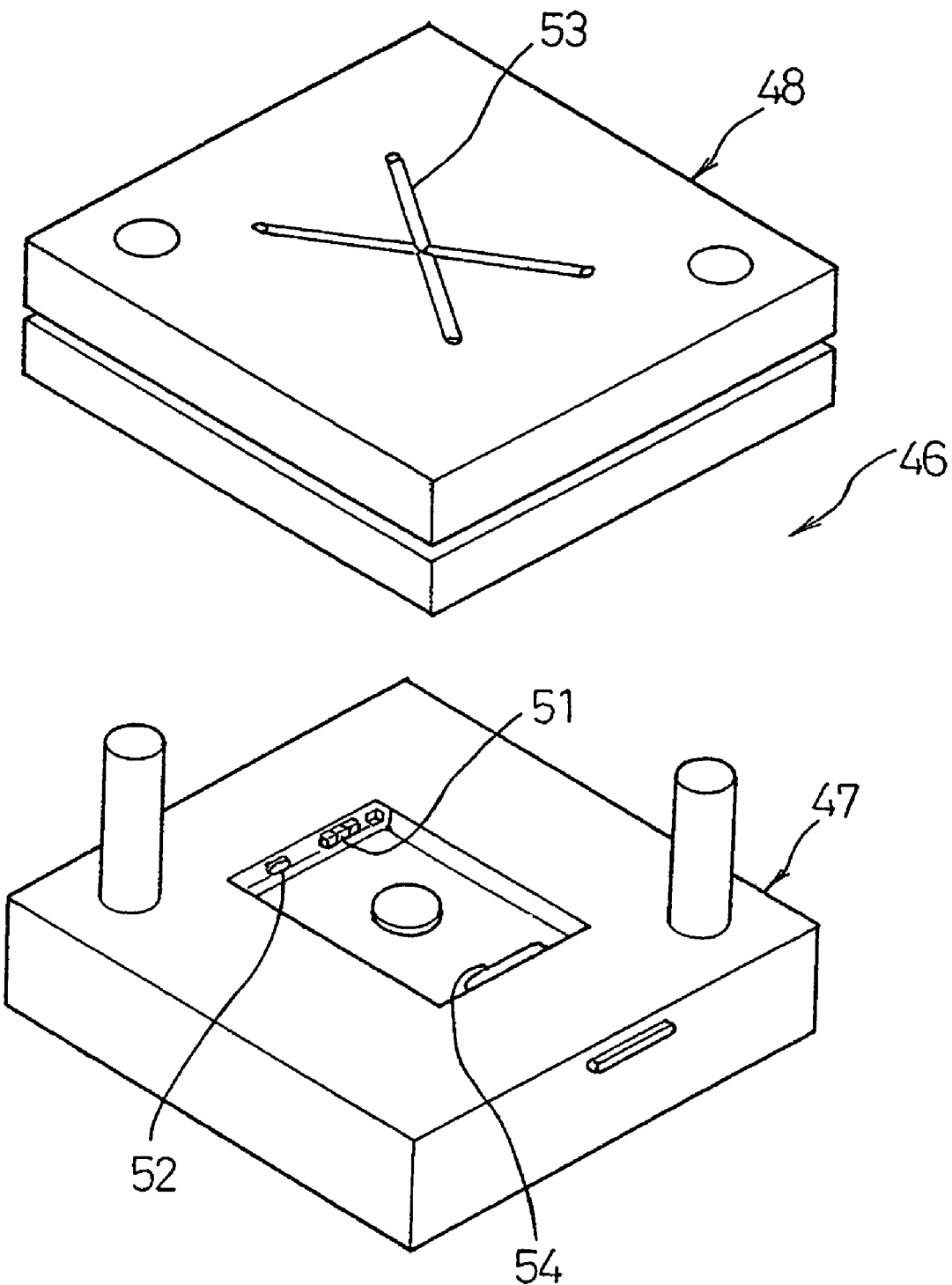
FIG. 12 is a perspective view illustrating the structure of a secondary molding die.

In the secondary molding, the intermediate product 8 is placed in a secondary molding die 46 shown in FIG. 12, so that predetermined parts of the intermediate product 8 are packed with resin. A lower die 47 of the secondary molding die 46 has a cavity 50 for accommodating the intermediate product 8; in a wall on one side of the cavity 50 are provided inwardly biased projections 51, 52 for the three external terminals and test terminal, and in the opposite wall is provided an inwardly biased projection 54 for the bottom face of the battery. When the intermediate product 8 is placed in the cavity 50 and these projections 51, 52, 54 are moved forward, they make pressure contact with the external terminals 6 at three locations on the circuit substrate 3, the test terminal 30, and the insulator 14 bonded on the bottom face of the rechargeable battery 2, respectively.

Figure 13:
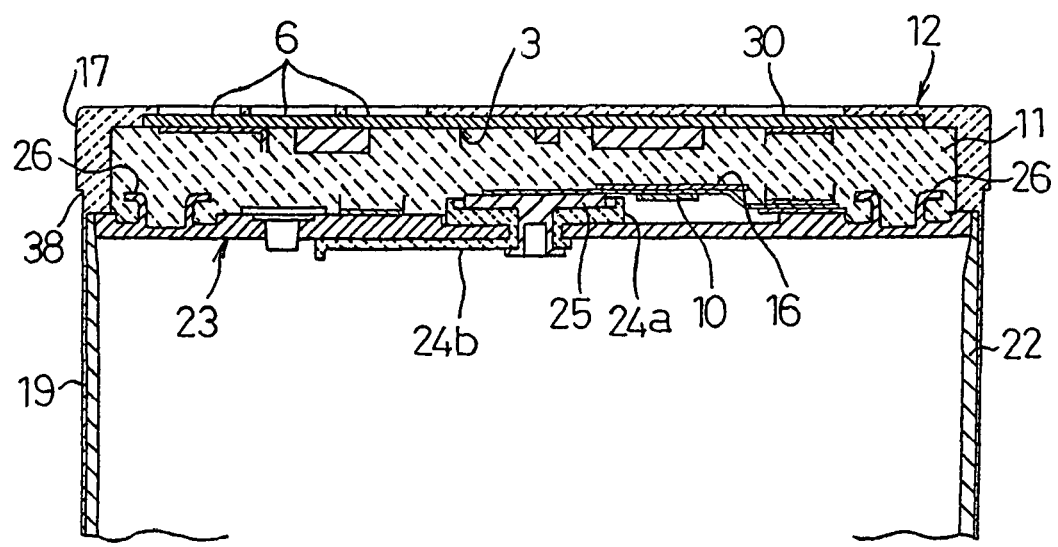
FIG. 13 is a cross-sectional view illustrating a resin mold formed by the secondary molding.
Figure 20C:
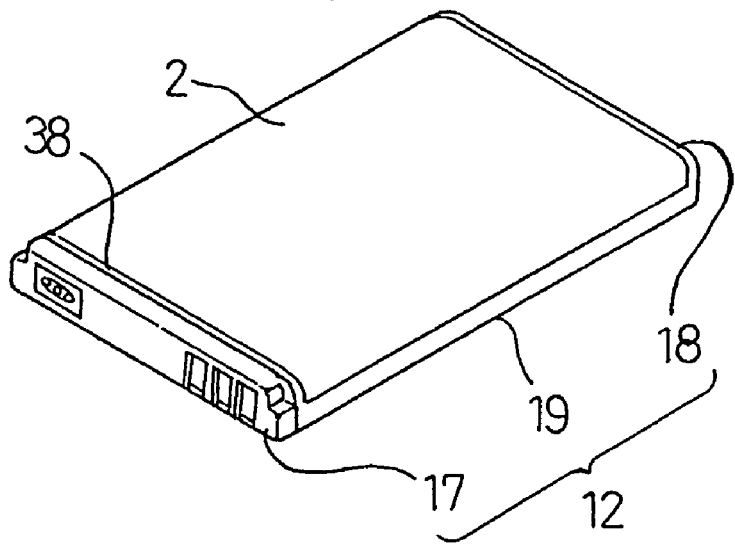

The lower die 47 accommodating the intermediate product 8 is then closed by an upper die 48, and resin is filled from a gate 53 provided in the upper die 48 into the secondary molding die 46. The resin is injected into the secondary molding die 46 from four locations and covers the circuit substrate 3 and the primary mold 11 while exposing the external terminals 6 and the test terminal 30 of the intermediate product 8 to the outside as shown in FIG. 13, and forms an upper mold 17 fixed on the sealing plate 23 of the battery 2 as shown in FIG. 20C, a lower mold 18 fixed on the bottom face of the rechargeable battery 2 to a predetermined thickness such as to surround the insulator 14; and a connecting mold part 19 for coupling the upper mold 17 and the lower mold 18 along two corners on one side of the rechargeable battery. The connecting mold part 19 is formed such that the two parts of the arc on one side of the oval cross section of the rechargeable battery 2 at 90 degrees are right-angled. These upper mold 17, the lower mold 18, and the connecting mold part 19 together form the secondary mold 12 shown in FIG. 2.

In the case of the intermediate product 8 obtained by the resin molding using the lower die 36a shown in FIG. 9B, although there are variations in the height H4 of the intermediate product 8 because of the variations in the height h of the rechargeable battery 2 as mentioned above, these variations are absorbed in the molding of the secondary mold 12 with a constant height.

The intermediate product 8 has its active parts such as external terminals 6 connected to both positive and negative terminals of the battery 2 exposed on the outside; similarly to the first molding die 35, portions of the secondary molding die 46 to which the exposed active parts may contact, i.e., the projections 51, 52 to which the external terminals 6 and the test terminal 30 will contact, are provided with insulation coating by an alumina or fluorine resin coating process so as to prevent short circuits or leaks in the intermediate product 8.

The upper mold 17 has a step 38 in its periphery near the rechargeable battery, which defines a line along which a winding sheet 20 is wound around the periphery of the rechargeable battery 2. The battery operation is then inspected using the test terminal 30, and the water ingress label 9 is bonded in the cavity surrounding the test terminal 30 of the batteries that have passed the inspection, whereby the battery pack 1 shown in FIG. 1 is obtained.

The battery pack 1 thus formed has curved shoulders on one flat side corresponding to the arc on both sides of the rechargeable battery 2, while the other two corners on the opposite side are right-angled because of the connecting mold part 19, as shown in FIG. 1; this feature, coupled with the asymmetric arrangement of the external terminals 6, prevents the battery to be reversely loaded in equipment. The curved corners will snugly fit in rounded corners in the battery accommodation case of the equipment without leaving any dead space.

Figure 15:
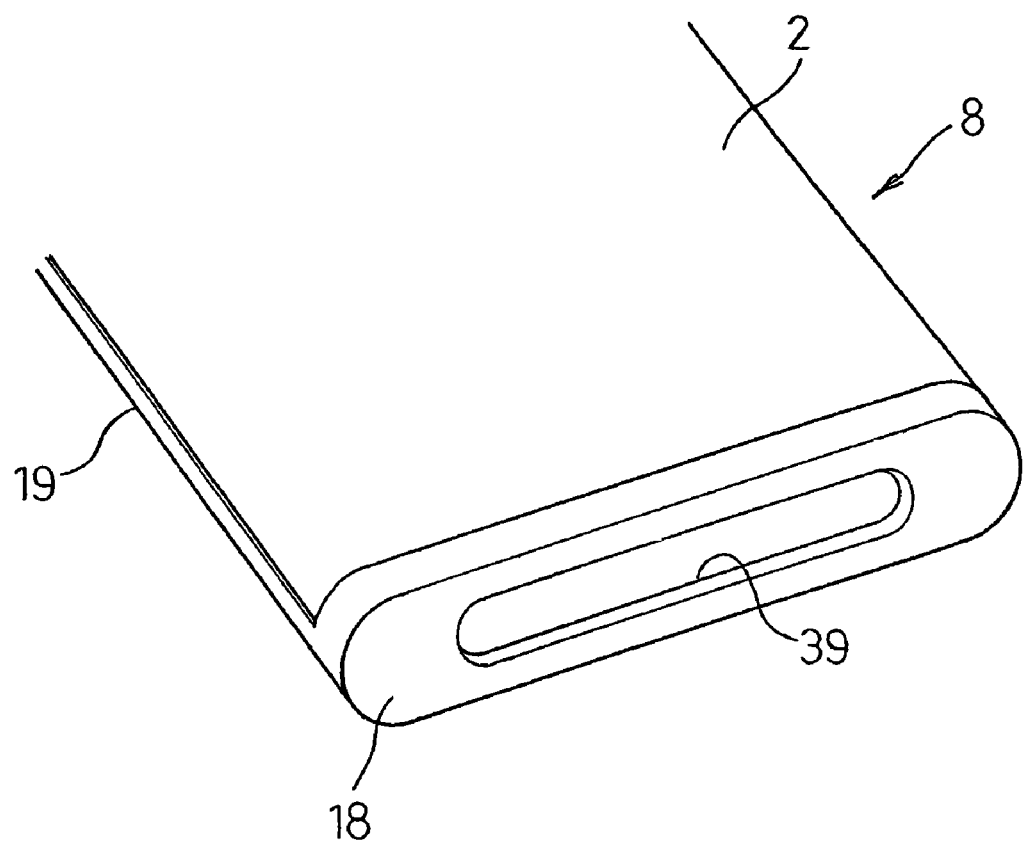
FIG. 15 is a perspective view illustrating a recess formed in the bottom face of an intermediate product.

Moreover, the intermediate product 8 has a cavity 39 on the bottom face side as shown in FIG. 15 because no resin is filled in the central portion of the insulator 14 bonded to the bottom face of the rechargeable battery 2 due to the projection 54 on the lower mold 47 contacting thereto. Since the battery pack 1 is loaded in a confined accommodation space in the equipment, it is hard to take it out if there is nothing to get hold of. The cavity 39 functions as a nail hook, i.e., it will allow a user's nail to catch the bottom of the battery pack 1 and facilitate removal of the battery pack 1.

(Second Manufacturing Method)

The second manufacturing method differs from the previous one in the resin molding process of the object 7 to be resin packed for forming the primary mold 11. The method will be described below in which elements common to the first manufacturing method are given the same reference numerals and the description of same procedures is omitted.

Figure 16A:
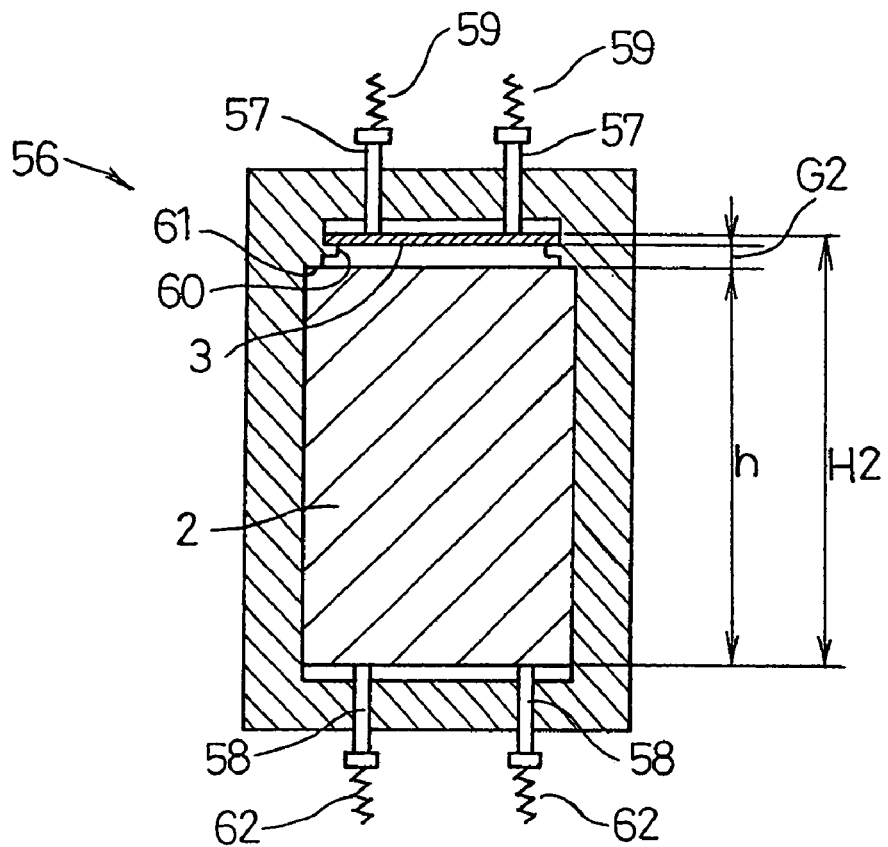
FIG. 16A is a schematic view for explaining how resin is filled according to a second manufacturing method.

The object 7 to be resin packed formed as shown in FIG. 20A is placed inside a lower die 56 of a primary molding die shown in FIG. 16A. Pressing shafts 57 on the wall on one side of the lower die 56 are driven by biasing means 59 to press the circuit substrate 3 so that both ends of the circuit substrate 3 make contact with a wall 60 that defines the position of the substrate. The rechargeable battery 2 is pushed by pressing shafts 58 provided on the opposite wall of the lower die 56 and driven by biasing means 62 so that both ends of the sealing plate 23 abut on a wall 61 that defines the position of the battery. This positioning makes the position of the circuit substrate 3 constant, whereby the height H2 from the bottom face of the rechargeable battery 2 to the surface of the circuit substrate 3 where the external terminals 6 are formed is controlled. An upper die (not shown) is then lowered onto the lower die 56 in which are placed the rechargeable battery 2 and the circuit substrate 3 in position, and the constant gap G2 between the battery and substrate 3 is filled with resin, whereby an intermediate product 8 consisting of the rechargeable battery 2 and the circuit substrate 3 united by a primary mold 11 formed by the cured resin is obtained.

The entire height H2 of the intermediate product 8 thus formed by the primary molding varies because of the variations in the height h of the rechargeable battery 2. These variations in the height H2 are absorbed by varying thickness of the lower mold 18 formed on the bottom face of the rechargeable battery 2 in the secondary molding process using the secondary molding die 46 shown in FIG. 12, so that complete battery packs 1 will have a constant height. The process of providing the outer covering is the same as that of the first manufacturing method and its description will not be repeated.

Figure 16B:
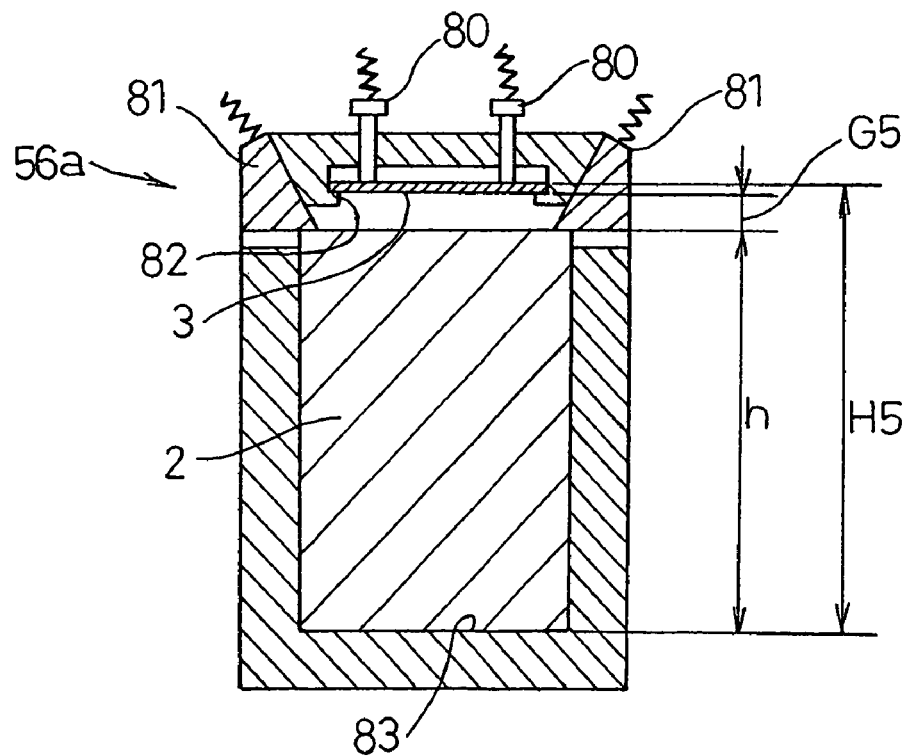
FIG. 16B is a schematic view for explaining another embodiment of the resin filling according to the same method.

FIG. 16B shows an alternative structure of the lower die 56 for the positioning of the battery 2; while there are variations in the height H2 of the intermediate product 8 because of the variations in the height h of the rechargeable battery 2, the lower die 56a shown in FIG. 16B forms intermediate products 8 with a constant height H5.

As shown in FIG. 16B, the rechargeable battery 2 is biased by battery biasing means 81 to make contact with a wall 83 of the lower die 56a that defines the position of the battery, and the circuit substrate 3 is pressed by substrate biasing means 80 to make contact with a wall 82 of the lower die 56a that defines the position of the substrate. This structure of the lower die 56a makes the position of the circuit substrate 3 constant, and the variations in the height h of the rechargeable battery 2 are absorbed by varying gap G5 between the rechargeable battery 2 and the circuit substrate 3, whereby resultant intermediate products 8 have a constant height H5.

(Third Manufacturing Method)

The third manufacturing method differs from the previous ones in the resin molding process of the object 7 to be resin packed. The method will be described below in which elements common to the first and second manufacturing methods are given the same reference numerals and the description of same procedures is omitted.

Figure 17:
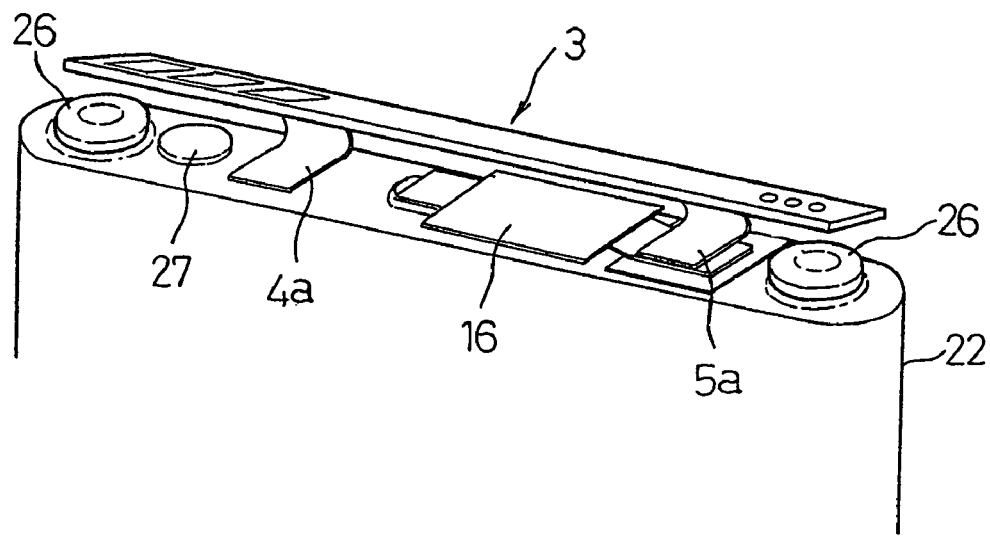
FIG. 17 is a perspective view illustrating how the circuit substrate is connected to the rechargeable battery according to a third manufacturing method.

In the third manufacturing method, the positive and negative lead plates 4a, 5a for connecting the circuit substrate 3 to the rechargeable battery 2 are made of a material that exhibits resilience when bent, as shown in FIG. 17. After soldering one ends of the positive and negative lead plates 4a, 5a to the circuit substrate 3, the other ends are spot-welded to the rechargeable battery 2 as shown in FIG. 5A; when the lead plates are bent so that the circuit substrate 3 is substantially parallel to the sealing plate 23 of the rechargeable battery 2 as shown in FIG. 5B, the circuit substrate 3 is not parallel to the sealing plate 23 because of the resilience in the positive and negative lead plates 4a, 5a and connected to the rechargeable battery 2 in an inclined state as shown in FIG. 17 when complete as an object 7 to be resin packed.

Figure 18:
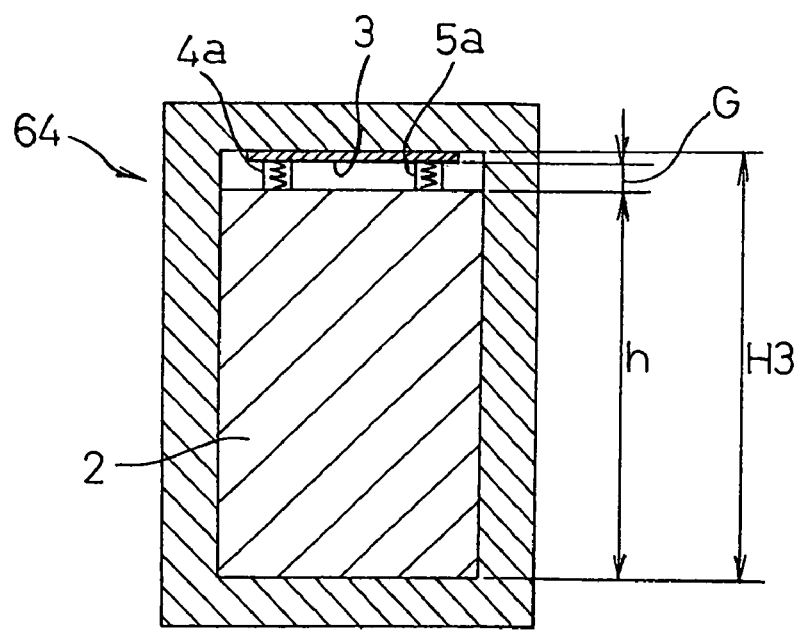
FIG. 18 is a schematic view for explaining how resin is filled according to the third manufacturing method.

The object 7 to be resin packed is placed in a lower die 64 of a primary molding die shown in FIG. 18, in which the dimension H3 corresponding to the distance from the bottom face of the rechargeable battery 2 to the surface of the circuit substrate 3 on which the external terminals 6 are formed is precisely controlled. The circuit substrate 3 is not parallel to the sealing plate 23 of the rechargeable battery 2, but is press-fitted into the lower die 64, whereupon it makes tight contact with the walls of the lower die 64 whose dimension H3 is controlled and fits in parallel to the sealing plate 23, and also, the rechargeable battery 2 is pressed against the opposite wall because of the bias provided by the resilience in the positive and negative lead plates 4a, 5a. By thus accommodating the object 7 to be resin packed in the lower die 64, variations in the height h of the rechargeable battery 2 and in the position of the circuit substrate 3 are absorbed by the resilience to bending of the positive and negative lead plates 4, 5, whereby the dimension H3 from the bottom face of the rechargeable battery 2 to the surface of the circuit substrate 3 on which the external terminals 6 are formed is controlled to be constant.

An upper die (not shown) is then lowered onto the lower die 64 in which is placed the object 7 to be resin packed, and resin is filled in the gap G between the rechargeable battery 2 and the circuit substrate 3, whereby the rechargeable battery 2 and the circuit substrate 3 are fixedly united by the filled resin and formed into the intermediate product 8 shown in FIG. 20B.

The process of providing the outer covering to this intermediate product 8 is the same as that of the first and second manufacturing methods and its description will not be repeated.

(Fourth Manufacturing Method)

The fourth manufacturing method differs from the previous ones in the resin molding process of the object 7 to be resin packed for forming the primary mold 11. The method will be described below in which elements common to the first and second manufacturing methods are given the same reference numerals and the description of same procedures is omitted.

The object 7 to be resin packed formed as shown in FIG. 20A is placed inside a lower die 91 of a primary molding die shown in FIG. 19A. Both ends of the circuit substrate 3 are fitted into a groove 92 that is formed in the lower die 91 to define the position of the substrate. The rechargeable battery is pushed by biasing means 94 provided in the lower die 91 so that both ends of the sealing plate 23 make contact with a wall 93 that defines the position of the battery. This positioning makes the position of the circuit substrate 3 constant, whereby the height H6 from the bottom face of the rechargeable battery 2 to the surface of the circuit substrate 3 where the external terminals 6 are formed is controlled. An upper die (not shown) is then lowered onto the lower die 91 in which are placed the rechargeable battery 2 and the circuit substrate 3 in position, and resin is filled in the gap G6 between the rechargeable battery 2 and the circuit substrate 3, whereby an intermediate product 8 consisting of the rechargeable battery 2 and the circuit substrate 3 united by a primary mold 11 formed by the cured resin is obtained.

The entire height H6 of the intermediate product 8 thus formed by the primary molding varies because of the variations in the height h of the rechargeable battery 2. These variations in height H6 are absorbed by varying thickness of the lower mold 18 formed on the bottom face of the rechargeable battery 2 in the secondary molding process using the secondary molding die 46 shown in FIG. 12, so that complete battery packs 1 will have a constant height. The process of providing the outer covering is the same as that of the first manufacturing method and its description will not be repeated.

FIG. 19B shows an alternative structure of the lower die 91 for the positioning of the rechargeable battery 2; while there are variations in the height H6 of the intermediate product 8 because of the variations in the height h of the rechargeable battery 2, the lower die 91a shown in FIG. 19B forms intermediate products 8 with a constant height H7.

As shown in FIG. 19B, the rechargeable battery 2 is biased by battery biasing means 97 to make contact with a wall 96 of the lower die 91a that defines the position of the battery, and the circuit substrate 3 is kept in position with its both ends fitted in a groove 95 that defines the position of the substrate. This structure of the lower die 91a makes the position of the circuit substrate 3 constant, and the variations in the height h of the rechargeable battery 2 are absorbed by varying gap G7 between the rechargeable battery 2 and the circuit substrate 3, whereby resultant intermediate products 8 have a constant height H7.

The formation of an outer member on the intermediate product 8 of the battery pack 1 obtained through the above-described manufacturing methods is achieved by the provision of the secondary mold 12. Alternatively, the same structure as this battery pack with the secondary mold 12 is obtained by bonding a resin mold that is pre-molded by injection molding to the intermediate product 8. The following is a description of how such an outer member is formed using a resin mold. The object 7 to be resin packed will be described as the one shown in FIG. 6A to FIG. 8B that has the safety vent 20 and engaging members 26a welded on the rechargeable battery 2 to which the circuit substrate 3 is connected, but the same applies to the object 7 to be resin packed that was used in the above first to fourth manufacturing methods.

Figure 21:
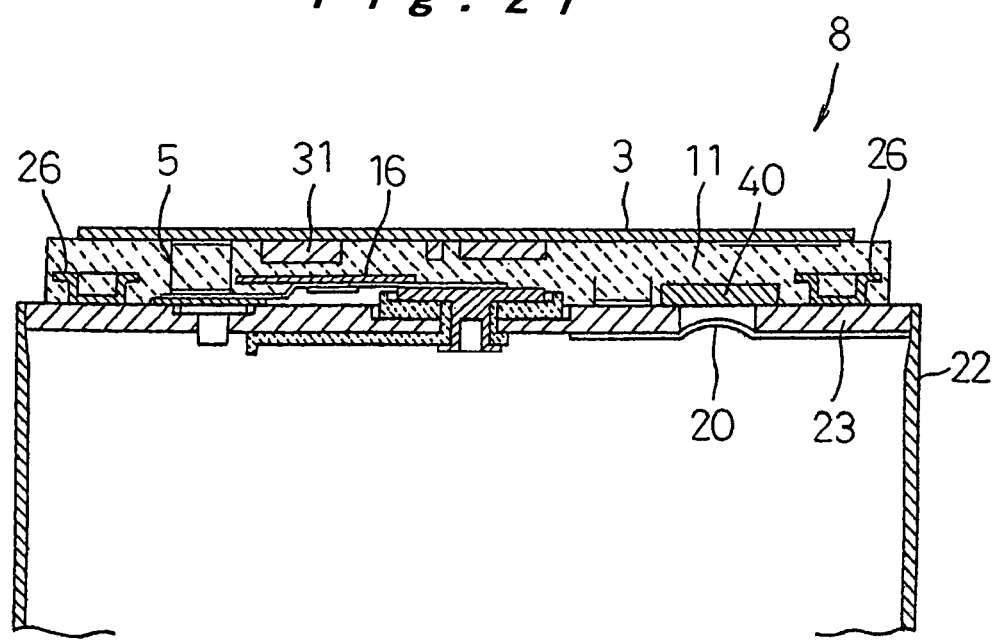
FIG. 21 is a partial cross-sectional view of an intermediate product.

FIG. 21 shows an intermediate product 8 consisting of a rechargeable battery 2 and a circuit substrate 3 united together by resin filled therebetween, to which an outer covering is provided to form a battery pack 1. The outer covering includes an upper resin mold 97 and a lower resin mold 98 for covering the top and bottom, and a winding sheet 13 affixed to the body.

Figure 14:
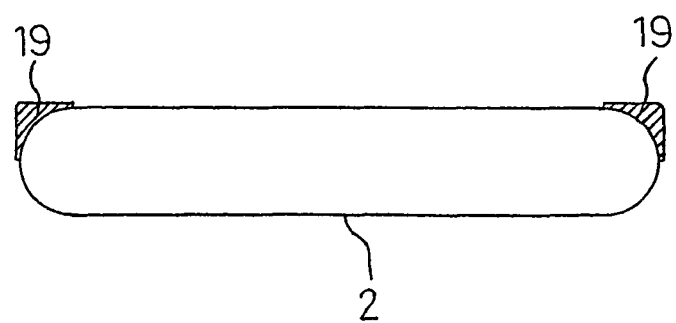
FIG. 14 is a cross-sectional view for explaining where a connecting mold part is formed.
Figure 22:
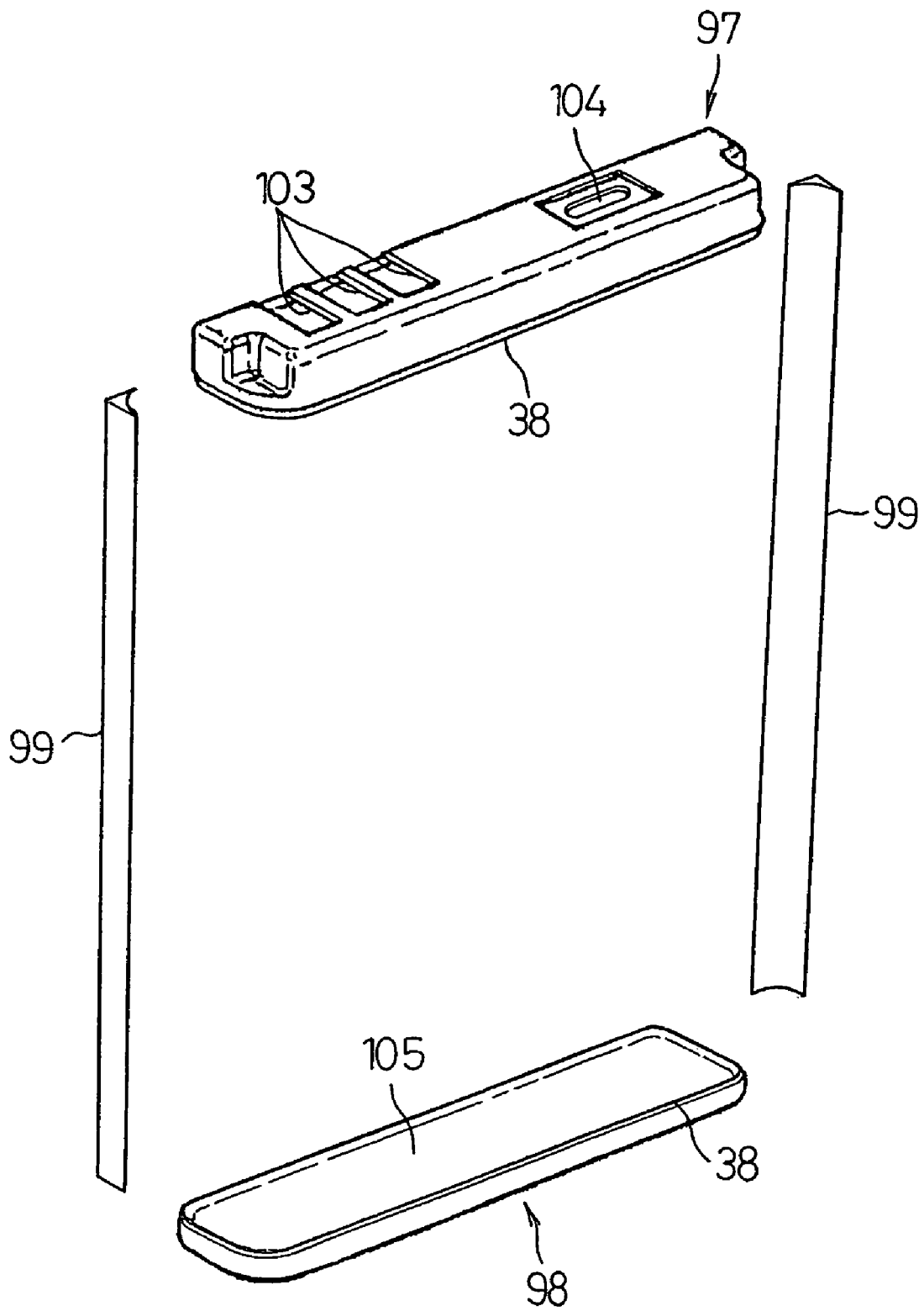
FIG. 22 is a perspective view illustrating resin molds.
Figure 23:
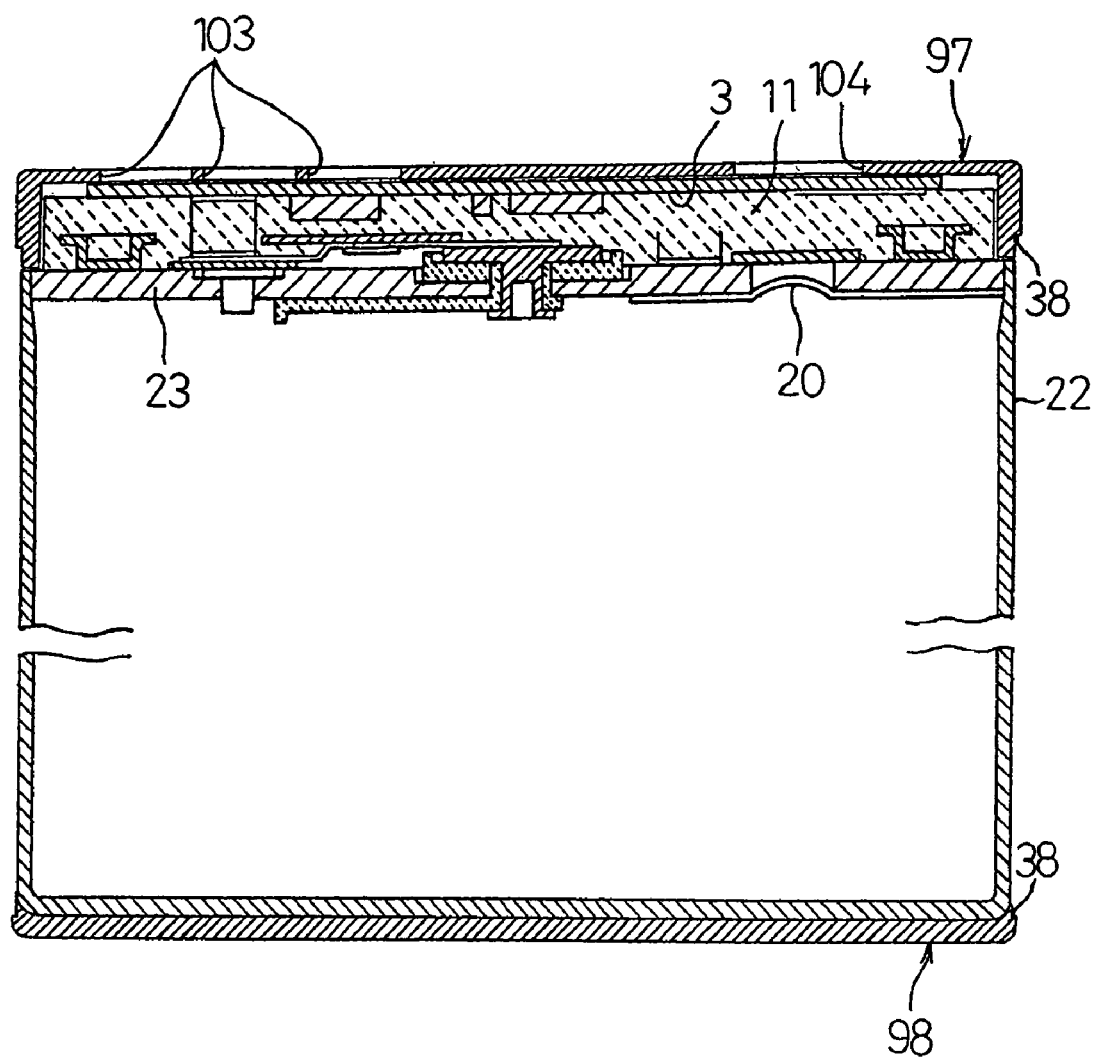
FIG. 23 is a cross-sectional view illustrating the intermediate product with the resin molds bonded thereto.

The upper resin mold 97 is formed by resin molding and has three connection terminal windows 103 and a test terminal window 104 corresponding to the three external terminals 6 and test terminal 30 formed on the circuit substrate 3, and covers the resin mold 11 formed on the sealing plate 23 and the circuit substrate 3 as shown in FIG. 22, so that it covers and bonds to the resin mold 11 and the circuit substrate 3 while exposing the external terminals 6 and the test terminal 30 to the outside through the windows 103, 104, respectively, as shown in FIG. 23. The lower resin mold 98 is formed by resin molding into a plate-like shape with a shallow indentation 105 that fits onto the bottom of the battery case 22 as shown in FIG. 22, and is bonded to the bottom face of the case 22 as shown in FIG. 23. The upper resin mold 97 and the lower resin mold 98 each have a step 38 that is flush with the side face of the battery case 22; this step 38 may be used as the reference line for determining the position of the winding sheet 13 when winding the same around the body of the rechargeable battery 2 as shown in FIG. 20C, but in order to give the aforementioned asymmetric shape to the battery pack 1, a couple of connection pieces 99 are bonded to the battery case 22 along the shorter sides of the rechargeable battery 2. The connection pieces 99 are formed such that the two parts of the arc on one side of the oval cross section of the battery case 22 at 90 degrees are right-angled, similarly to the connecting mold part 19 shown in FIG. 14. The drawing shows the connection pieces 99 as separate components, but they may integrally be formed with the upper resin mold 97 or with the lower rein mold 98.

Figure 24:
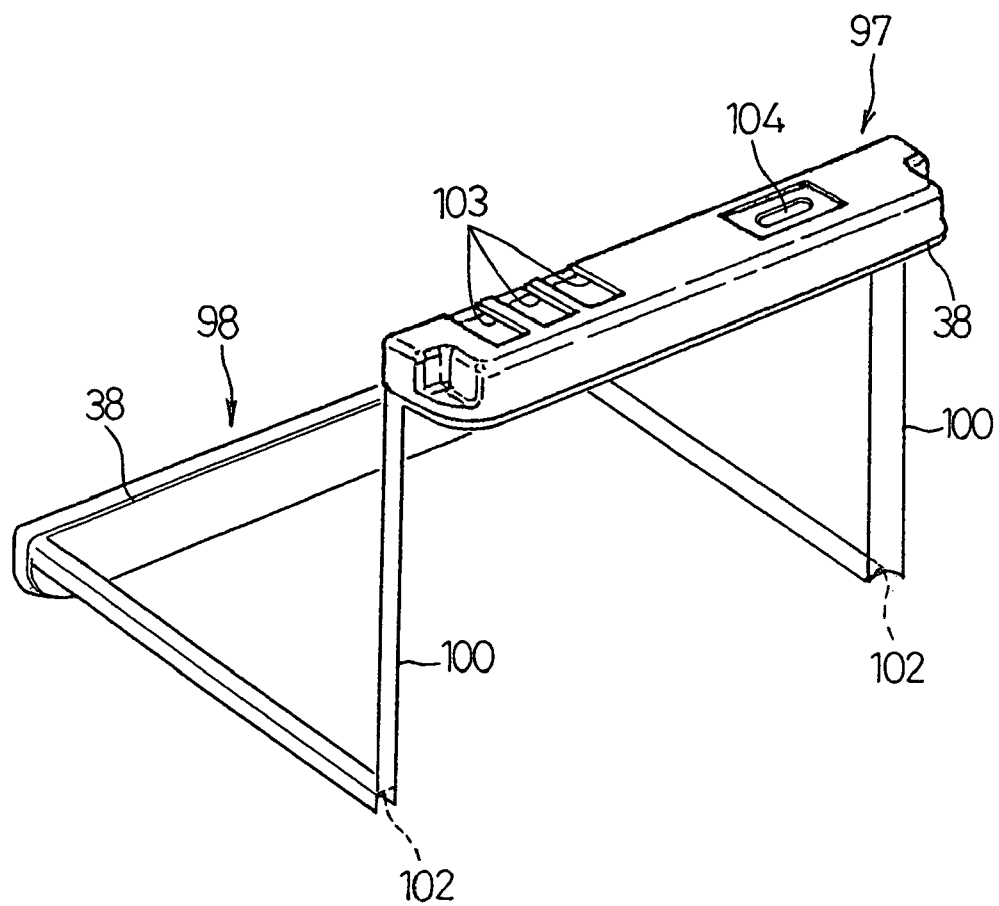
FIG. 24 is a perspective view illustrating a resin mold according to another embodiment.

Alternatively, the upper resin mold 97 and the lower resin mold 98 may be formed in one-piece with connection pieces 100 that are bendable at right angles at hinges 102 between the upper and lower resin molds, as shown in FIG. 24. When attaching the illustrated example of resin mold to the intermediate product 8, the upper resin mold 97 is first coupled onto the circuit substrate 3, and the connection pieces 100 are made straight by bending the hinges 102 so that the lower resin mold 98 is attached to the bottom face of the battery case 22 and the connection pieces 100 run along the sides of the case 22. The outer covering having such a one-piece structure will have enhanced rigidity because the upper and lower resin molds 97, 98 are coupled together by the connection pieces 100 and the winding sheet 13 is wound around over the connection pieces 100.

The above battery packs 1 were subjected to a 1.5 m free fall test on a concrete surface for two cycles for all the six sides, and falling tests in which battery packs were dropped 50 times from a height of 1 m onto an iron plate and randomly checked for mechanical properties, and then dropped 200 times and randomly checked for electrical characteristics, after which they were subjected to a heat shock test in which they underwent temperature changes ranging from −40° C. to 80° C. for several times, a vibration test in which vibration was applied from three directions, and a terminal test in which load was applied to the external terminals. The battery packs 1 that underwent these tests were then loaded on equipment, and inspection was made for any abnormality in the fitting between battery and equipment and in their performance, or any deformation or looseness. The results showed that these battery packs that underwent various tests were trouble-free and proved to have a rigid structure.

Inspection was also made for the effects of the high temperature of more than 200° C. during the resin molding on the rechargeable battery 2 and for any damage to the temperature fuse 10 arranged inside the molded resin, but no abnormality was found.

Further, the battery pack was disassembled on purpose to see how it looks when disassembled; it was much harder to disassemble as compared to the common pack case structure, and it was obvious that it is disassembled, because when the primary mold 11 was broken, the engaging protrusions 26 at both ends of the sealing plate 23 were torn apart, and the positive and negative lead plates 4, 5 and connecting parts inside the resin were also broken.

Moreover, variations in dimensions of various parts, including the distance from the bottom face to the external terminals 6 that must be precisely controlled, were all within a marginal range of plus or minus 0.1 to 0.2 mm, meaning that the battery packs would present no problem in the connection with the equipment.

Figure 25A:
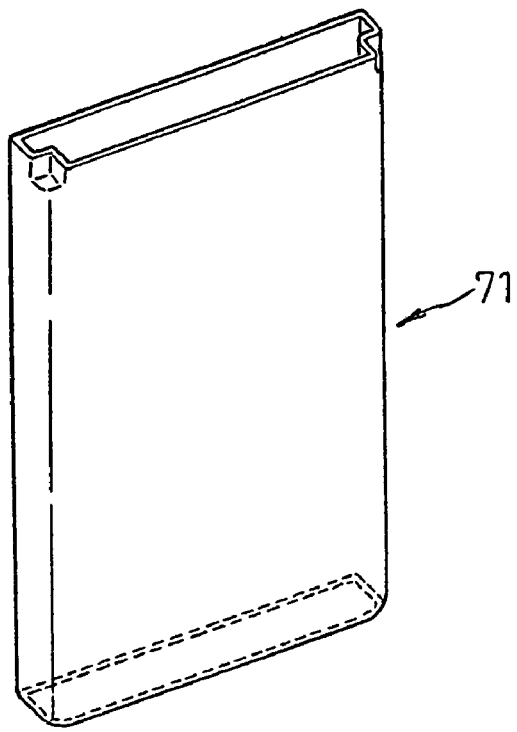
FIG. 25A and FIG. 25B are perspective views illustrating the structure of an outer case, which is another embodiment of outer covering.

The outer covering for the intermediate product 8 of the above-described structure consists of the secondary mold 12 formed at a preset location and the winding sheet 13, but the structure of the outer covering is not limited to this; the intermediate product 8 may be inserted into a tube-like outer case 71 shown in FIG. 25A, the opening at the bottom sealed with resin, and the opening at the top filled with resin such that the external terminals 6 and the test terminal 30 are exposed, so as to form a battery pack having a similar outer shape as that of the battery pack 1.

Figure 25B:
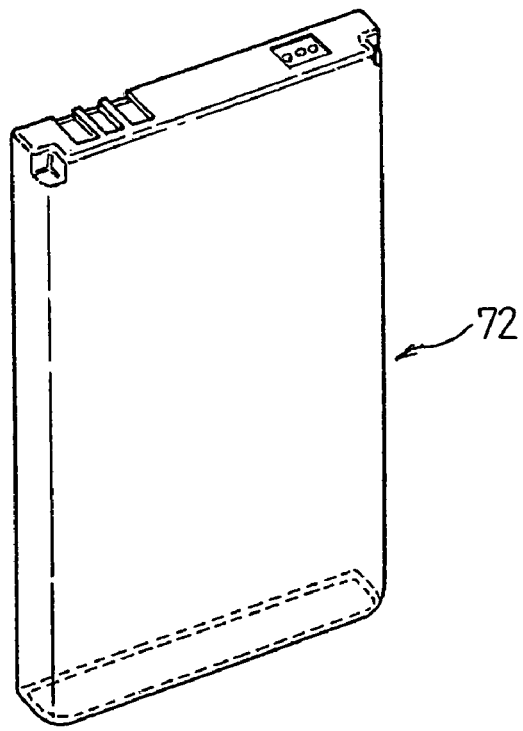
Figure 26A:
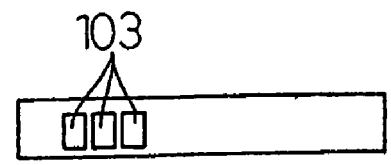
FIG. 26A and FIG. 26B are schematic views for explaining necessary precision in the locations of external terminals of a battery pack.
Figure 26B:
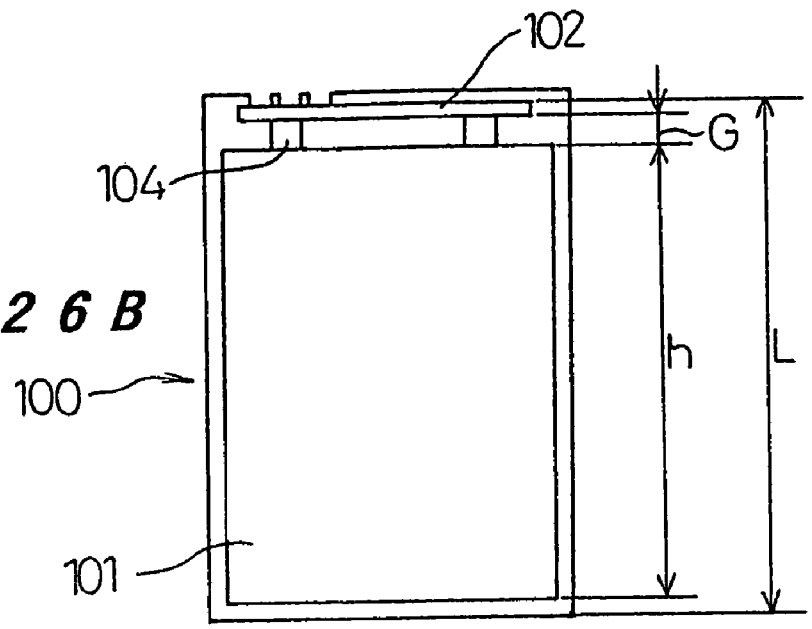

Also, the intermediate product 8 may be inserted into a bottomed tube-like outer case 72 formed with openings at locations corresponding to the external terminals 6 and the test terminal 30 as shown in FIG. 25B, and the opening at the bottom sealed with resin, so as to form a battery pack having a similar outer shape as that of the battery pack 1. The outer case 72 may have an open top instead of the open bottom, in which case the opening at the top will be filled with resin such that the external terminals 6 and the test terminal 30 are exposed, so as to form a battery pack having a similar outer shape as that of the battery pack 1.

Further, the intermediate product 8 may be resin-packed such that the external terminals 6 and the test terminal 30 are exposed, so as to form a battery pack similar to the battery pack 1 shown in FIG. 1.

INDUSTRIAL APPLICABILITY

According to the present invention, as described above, after uniting the rechargeable battery and the circuit substrate by resin molding, one end of the battery on which external terminals are formed is covered by a resin-molded outer member, so that, while the resin used for the resin molding may have low hardness, the outer member is formed of a resin that has required hardness. The outer member is not susceptible to scratches or contaminants, the internal structure is reinforced by the resin mold, and moreover, the battery pack is designed to allow the shape and size of the rechargeable battery to be as small and thin as possible; the invention thus provides a battery pack that is suitable as a battery power source of small portable electronic equipment, having enough rigidity to withstand impact in a falling accident or the like, and a structure for preventing accidental disassembly and wrong use.

Furthermore, according to the invention, when uniting the rechargeable battery and the circuit substrate by resin molding into the battery pack, the dimension from the bottom face to the opposite end where the external terminals are formed is made constant; the invention thus provides a suitable manufacturing method of a battery pack that is suitable as a battery power source of small portable electronic equipment, having a reliable electrical connection and enough rigidity to withstand impact in a falling accident or the like.

The invention claimed is:

1. A method for manufacturing a battery pack, comprising:
   providing a rechargeable battery having a sealing plate on a sealing plate side and a bottom face;
   connecting a circuit substrate having an external terminal to the rechargeable battery by a connecting member;
   said circuit substrate having a first substrate side surface on which said external terminal is disposed and having a second substrate side surface opposite said first substrate side surface;
   arranging the circuit substrate such that said second substrate side surface of the circuit substrate faces the sealing plate of the rechargeable battery and defines a gap therebetween thereby forming an object to be resin packed;
   placing the object to be resin packed inside a die such that the rechargeable battery and the circuit substrate are in predetermined positions;
   filling the gap between the rechargeable battery and the circuit substrate with resin thereby forming an intermediate product by integrally uniting the rechargeable battery and the circuit substrate; and
   forming an outer covering such that at least the external terminal of the intermediate product is exposed to the outside.

2. The method for manufacturing a battery pack according to claim 1, wherein:
   the outer covering provided to the intermediate product includes an upper mold covering the first circuit substrate surface and the sealing plate of the rechargeable battery while exposing at least a terminal surface of the external terminal to the outside wherein the upper mold includes an outer upper mold surface and an aperture aligned with and exposing the terminal surface and said terminal surface is disposed not extending beyond said outer upper mold surface;
   a lower mold formed on the bottom face of the rechargeable battery having a predetermined height; and
   a connecting mold part that couples the upper mold and the lower mold along the shorter sides of the rechargeable battery, the molds being formed by a secondary molding process, and a sheet is wound around to cover the side faces of the rechargeable battery, part of the side faces of the upper mold and the lower mold, and the connecting mold part.

3. The method for manufacturing a battery pack according to claim 2, wherein the rechargeable battery is formed to have an oval cross section, and the connecting mold part is molded to conform to part of a rectangle that surrounds circular arcs at both ends of the oval cross section.

4. A method for manufacturing a battery pack comprising:
   providing a flat prismatic rechargeable battery having a sealing plate on a sealing plate side and a bottom face;
   connecting a circuit substrate having an external terminal to the flat prismatic rechargeable battery on the sealing plate side thereof by a connecting member;
   said circuit substrate having a first substrate side surface on which said external terminal is disposed and having a second substrate side surface opposite said first substrate side surface;
   arranging the circuit substrate so that the said second substrate side surface of the circuit substrate faces the sealing plate of the rechargeable battery and defines a gap therebetween thereby forming an object to be resin packed;
   placing the object to be resin packed inside a die such that a bias is applied thereto so that either one of the sealing plate side and the bottom face of the rechargeable battery abuts on a first wall of the die that defines position of the battery;
   arranging the circuit substrate by vacuum suction on a second wall of the die that defines a position of the substrate and is parallel to the first wall that defines the position of the battery;
   filling the gap between the rechargeable battery and the circuit substrate with resin to form an intermediate product by integrally uniting the rechargeable battery and the circuit substrate; and
   forming an outer covering such that at least the external terminal of the intermediate product is exposed to the outside.

5. A method for manufacturing a battery pack comprising:
   providing a flat prismatic rechargeable battery having a sealing plate on a sealing plate side and a bottom face;
   connecting a circuit substrate having an external terminal to the flat prismatic rechargeable battery on the sealing plate side thereof by a connecting member;

said circuit substrate having a first substrate side surface on which said external terminal is disposed and having a second substrate side surface opposite said first substrate side surface;

arranging the circuit substrate so that the second substrate side of the circuit substrate faces the sealing plate of the rechargeable battery and defines with a gap therebetween thereby forming an object to be resin packed;

placing the object to be resin packed inside a die such that a bias is applied thereto so that either one of the sealing plate and the bottom face of the rechargeable battery abuts on a first wall of the die that defines the position of the battery;

arranging the circuit substrate such that a bias is applied so that both ends of the circuit substrate abut on a second wall of the die that defines the position of the substrate and is parallel to the first wall that defines the position of the battery;

filling the gap between the rechargeable battery and the circuit substrate with resin to form an intermediate product by integrally uniting the rechargeable battery and the circuit substrate; and forming an outer covering such that at least the external terminal of the intermediate product is exposed to the outside.

6. A method for manufacturing a battery pack comprising:
providing a flat prismatic rechargeable battery having a sealing plate on a sealing plate side and a bottom face;
connecting a circuit substrate having an external terminal to the flat prismatic rechargeable battery on the sealing plate side thereof by a connecting member;
said circuit substrate having a first substrate side surface on which said external terminal is disposed and having a second substrate side surface opposite said first substrate side surface;
arranging the circuit substrate so that the second substrate side of the circuit substrate faces the sealing plate of the rechargeable battery and defines a gap therebetween thereby forming an object to be resin packed;
placing the object to be resin packed inside a die such that a bias is applied so that either one of the sealing plate side and the bottom face of the rechargeable battery abuts on a wall of the die that defines the position of the battery;
arranging the circuit substrate such that one edge of the circuit substrate fits in a groove that defines a position of the substrate and is formed parallel to the wall that defines the position of the battery;
filling a gap between the rechargeable battery and the circuit substrate with resin to form an intermediate product by integrally uniting the rechargeable battery and the circuit substrate; and
forming an outer covering such that at least the external terminal of the intermediate product is exposed to the outside.

7. A method for manufacturing a battery pack comprising:
providing a flat prismatic rechargeable battery having a sealing plate on a sealing plate side and a bottom face;
arranging a circuit substrate having an external terminal on a sealing plate side of the flat prismatic rechargeable battery to define a gap therebetween;
said circuit substrate having a first substrate side surface on which said external terminal is disposed and having a second substrate side surface opposite said first substrate side surface;
connecting the circuit substrate to the rechargeable battery by a resilient connecting member that biases the circuit substrate in a direction away from the rechargeable battery to form an object to be resin packed;
placing the object to be resin packed inside a die against the biasing force of the connecting member, the die having an inner space that restricts a dimension from the bottom face of the rechargeable battery to the first substrate side surface of the circuit substrate where the external terminal is formed;
filling a gap between the rechargeable battery and the circuit substrate with resin for forming an intermediate product by integrally uniting the rechargeable battery and the circuit substrate; and
forming an outer covering such that at least the external terminal of the intermediate product are exposed to the outside.

8. The method for manufacturing a battery pack according to any one of claims 1 to 7, wherein the sealing plate of the rechargeable battery is provided with an undercut portion that protrudes toward the circuit substrate, so that resin filled in the gap between the rechargeable battery and the circuit substrate firmly engages with the rechargeable battery with the resin being filled in a recess of the undercut portion to directly contact an entire surface of the undercut portion.

9. The method for manufacturing a battery pack according to any one of claims 1 to 7, wherein the outer covering is formed by sheathing the intermediate product with a tube-shaped member or a bottomed tube-shaped member having a predetermined height, and resin filling in an open end on one or both of the first substrate side surface of the circuit substrate and the bottom face of the rechargeable battery such that predetermined parts including the external terminal are exposed to the outside.

10. The method for manufacturing a battery pack according to any one of claims 1 to 7, wherein the outer covering is formed of resin such as to cover an entire surface of the intermediate product except for predetermined parts including the external terminal.

11. The method for manufacturing a battery pack according to any one of claim 1 to 7, wherein parts of the dies used for the primary and secondary molding that make contact with exposed active parts of the object to be resin packed or the intermediate product are provided with an insulation coating.

* * * * *